(12) United States Patent
Heo

(10) Patent No.: US 7,416,926 B2
(45) Date of Patent: Aug. 26, 2008

(54) LIQUID CRYSTAL DISPLAY DEVICE AND METHOD FOR FABRICATING THE SAME

(75) Inventor: Seung Ho Heo, Changwon-si (KR)

(73) Assignee: LG Display Co., Ltd., Seoul (KR)

( * ) Notice: Subject to any disclaimer, the term of this patent is extended or adjusted under 35 U.S.C. 154(b) by 183 days.

(21) Appl. No.: 11/311,688

(22) Filed: Dec. 20, 2005

(65) Prior Publication Data

US 2006/0138429 A1    Jun. 29, 2006

(30) Foreign Application Priority Data

Dec. 24, 2004  (KR) .................. 10-2004-0112581

(51) Int. Cl.
*H01L 21/00* (2006.01)
(52) U.S. Cl. .................. 438/153; 438/149; 438/155; 438/158; 438/164; 257/E31.079
(58) Field of Classification Search ............. 438/149, 438/153, 155, 158, 164
See application file for complete search history.

(56) References Cited

U.S. PATENT DOCUMENTS

2006/0138428 A1 *  6/2006  Ahn et al. .................. 257/72

* cited by examiner

*Primary Examiner*—Wai-Sing Louie
(74) *Attorney, Agent, or Firm*—McKenna Long & Aldridge LLP

(57) ABSTRACT

A liquid crystal display device according to an embodiment of the present invention a includes: a gate line on a substrate; a data line crossing the gate line to define a pixel area; a thin film transistor connected to the gate line and the data line; a semiconductor pattern extended from the thin film transistor to overlap along the data line; a gate insulating pattern that overlaps along the semiconductor pattern to insulate the gate line and the data line; a pixel electrode in the pixel area spaced apart from the gate line and the data line and connected to the thin film transistor; and a passivation film formed in an area where the pixel electrode is not present to form a border with the pixel electrode.

14 Claims, 23 Drawing Sheets

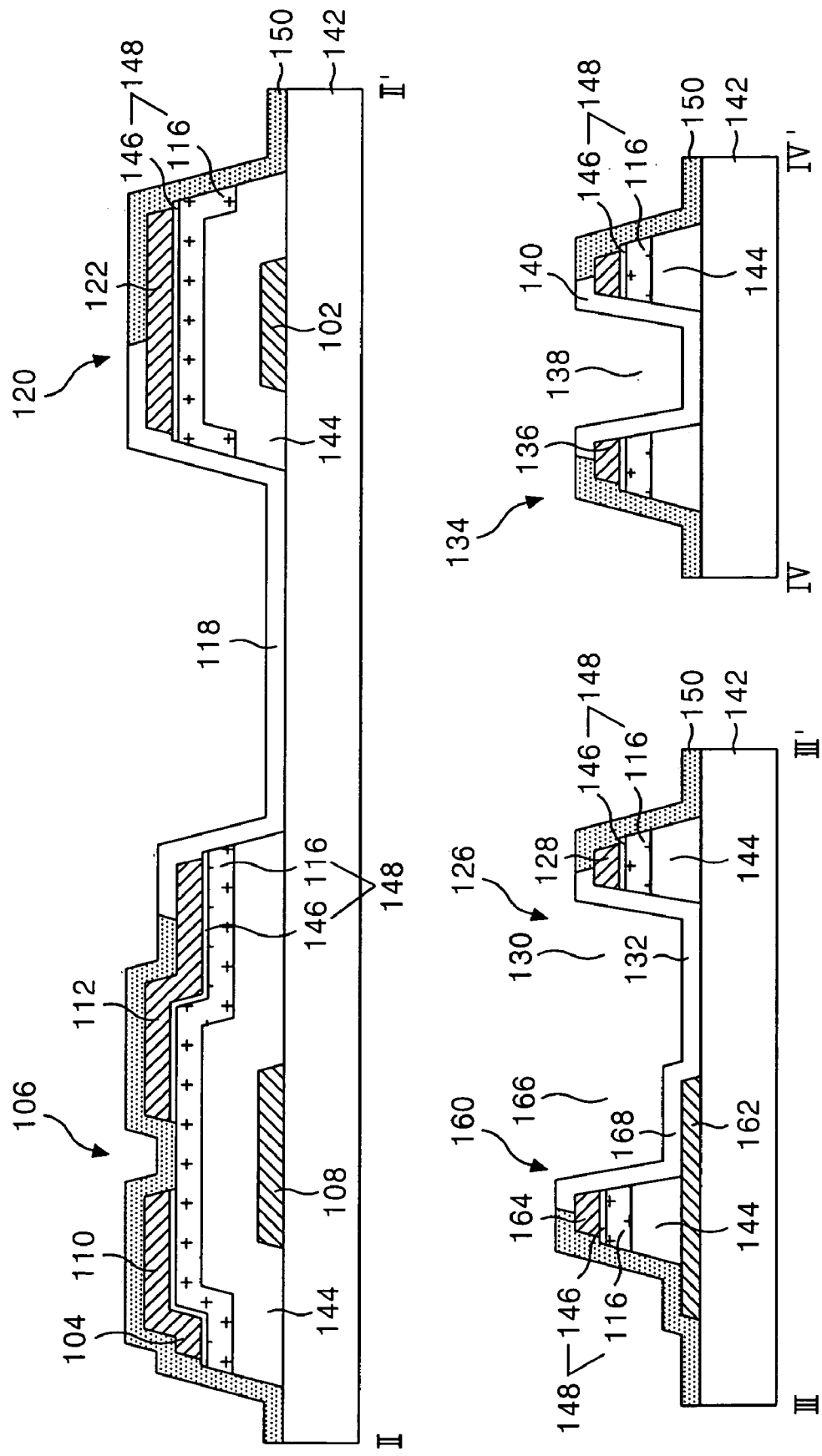

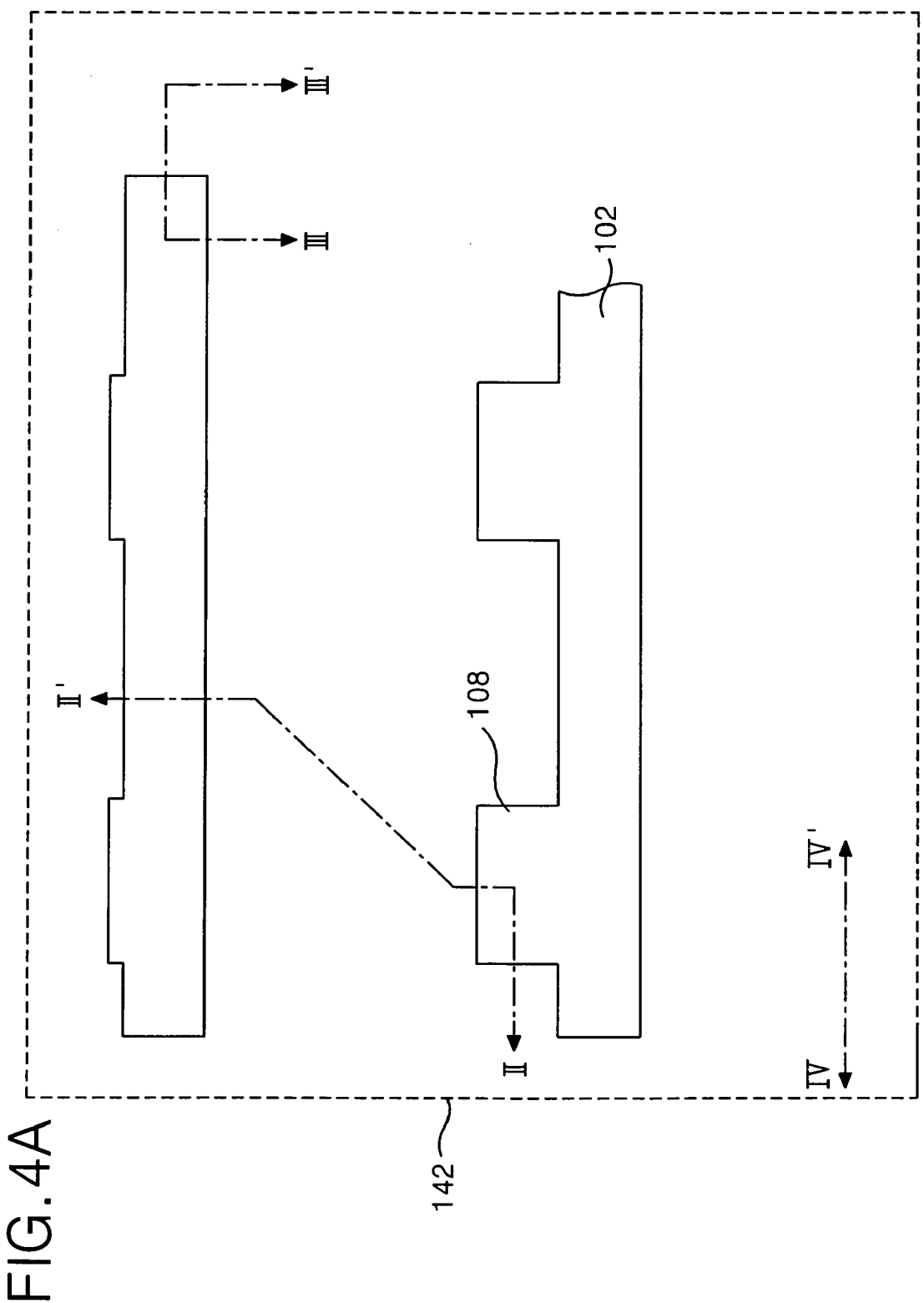

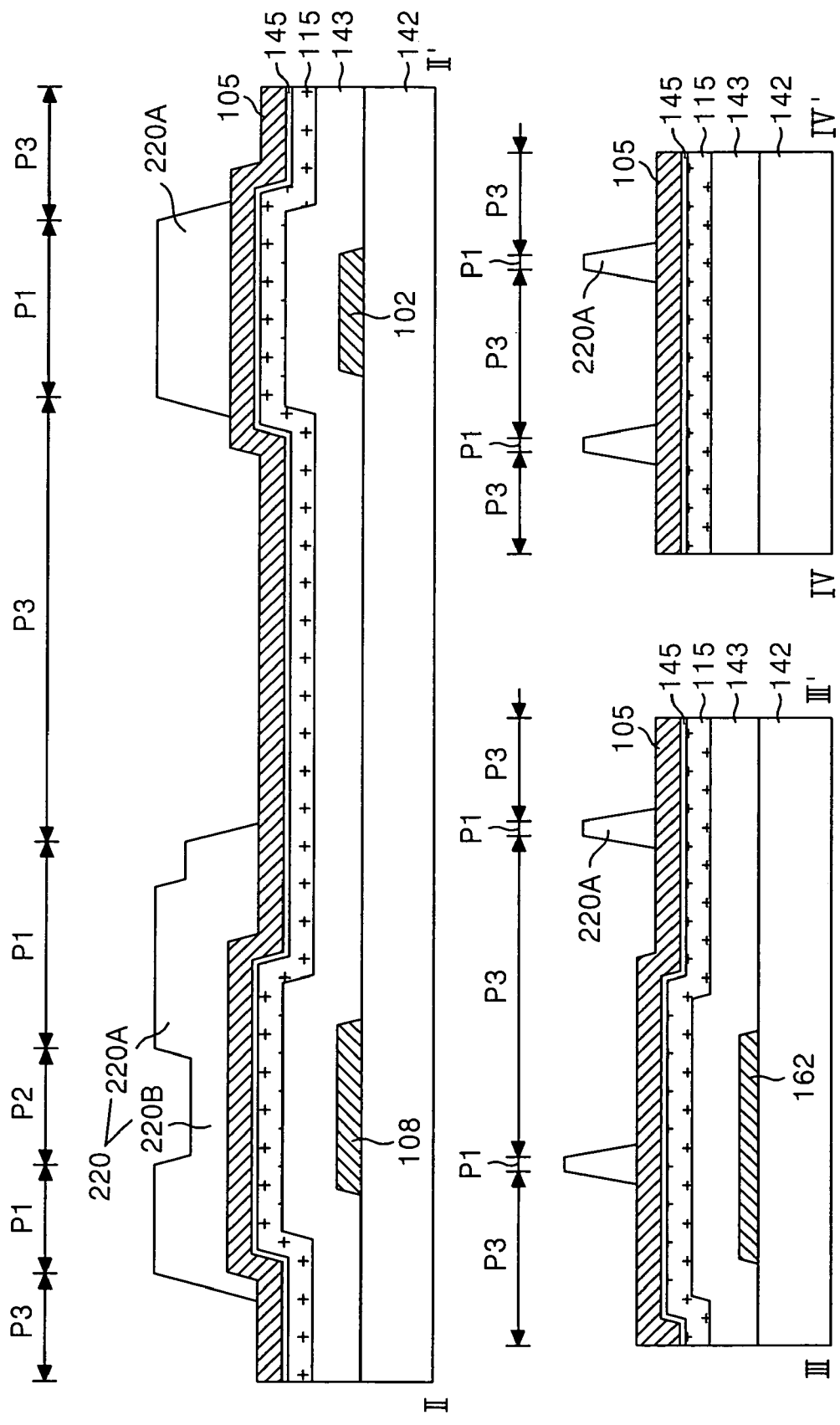

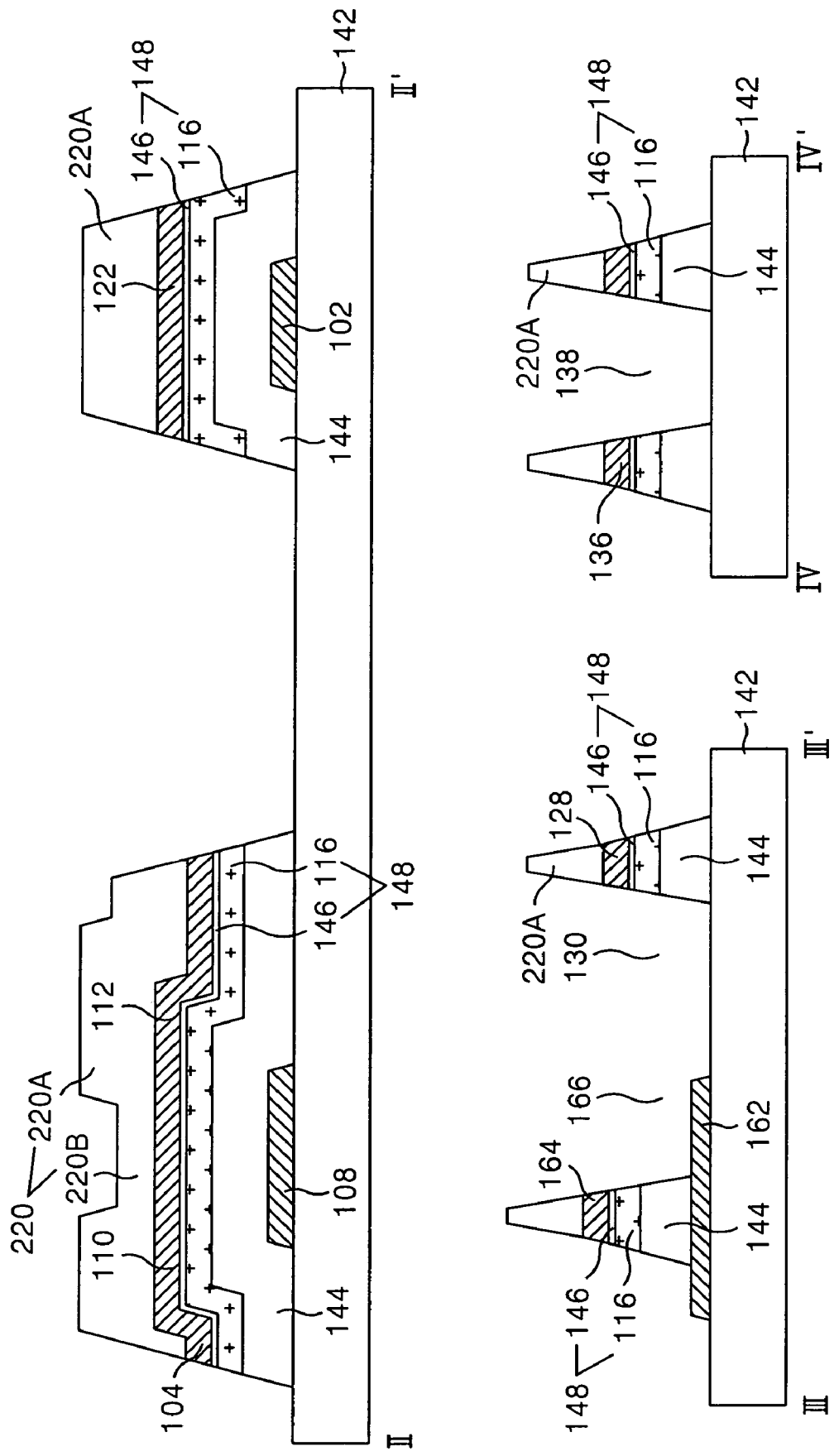

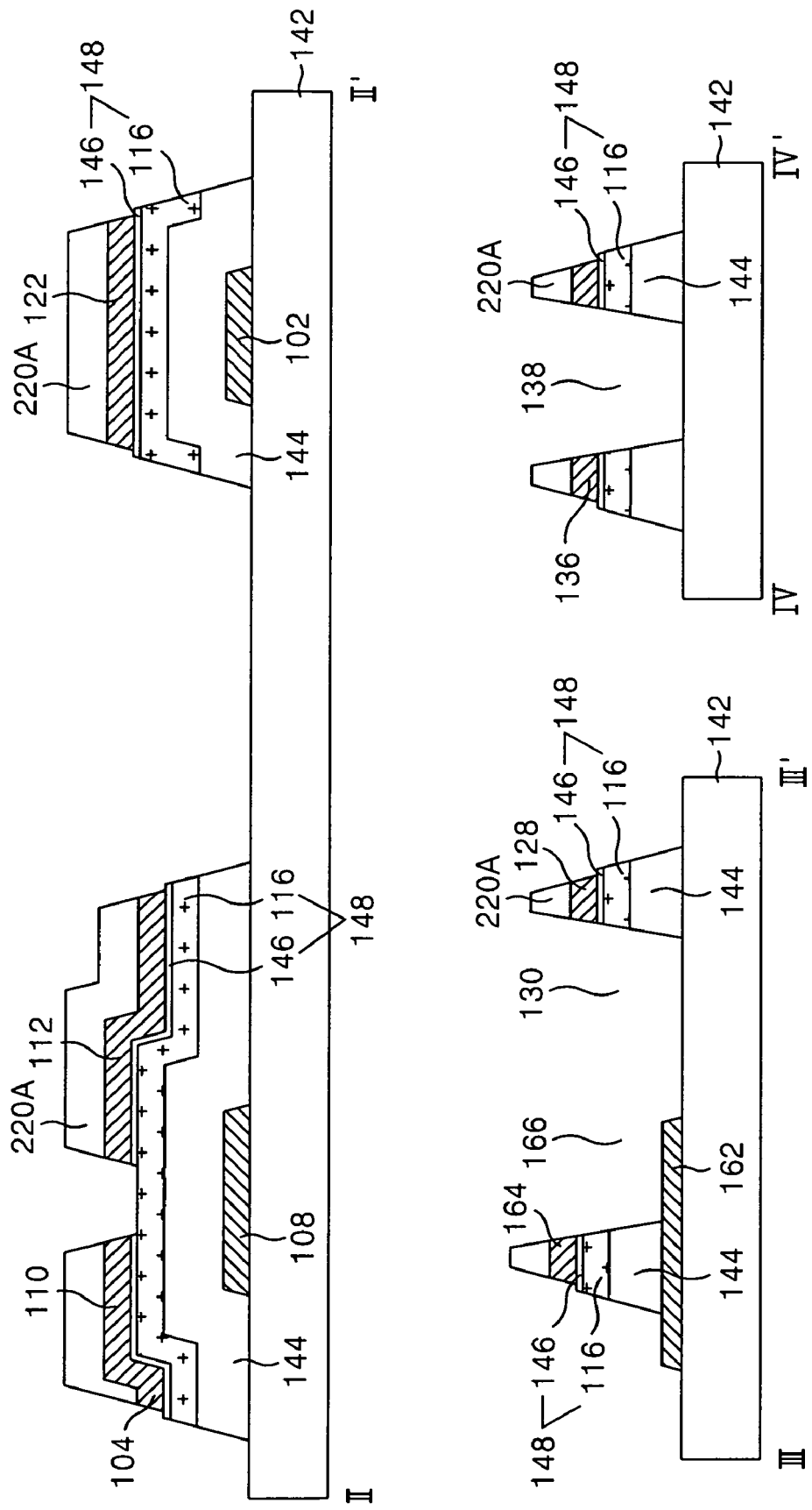

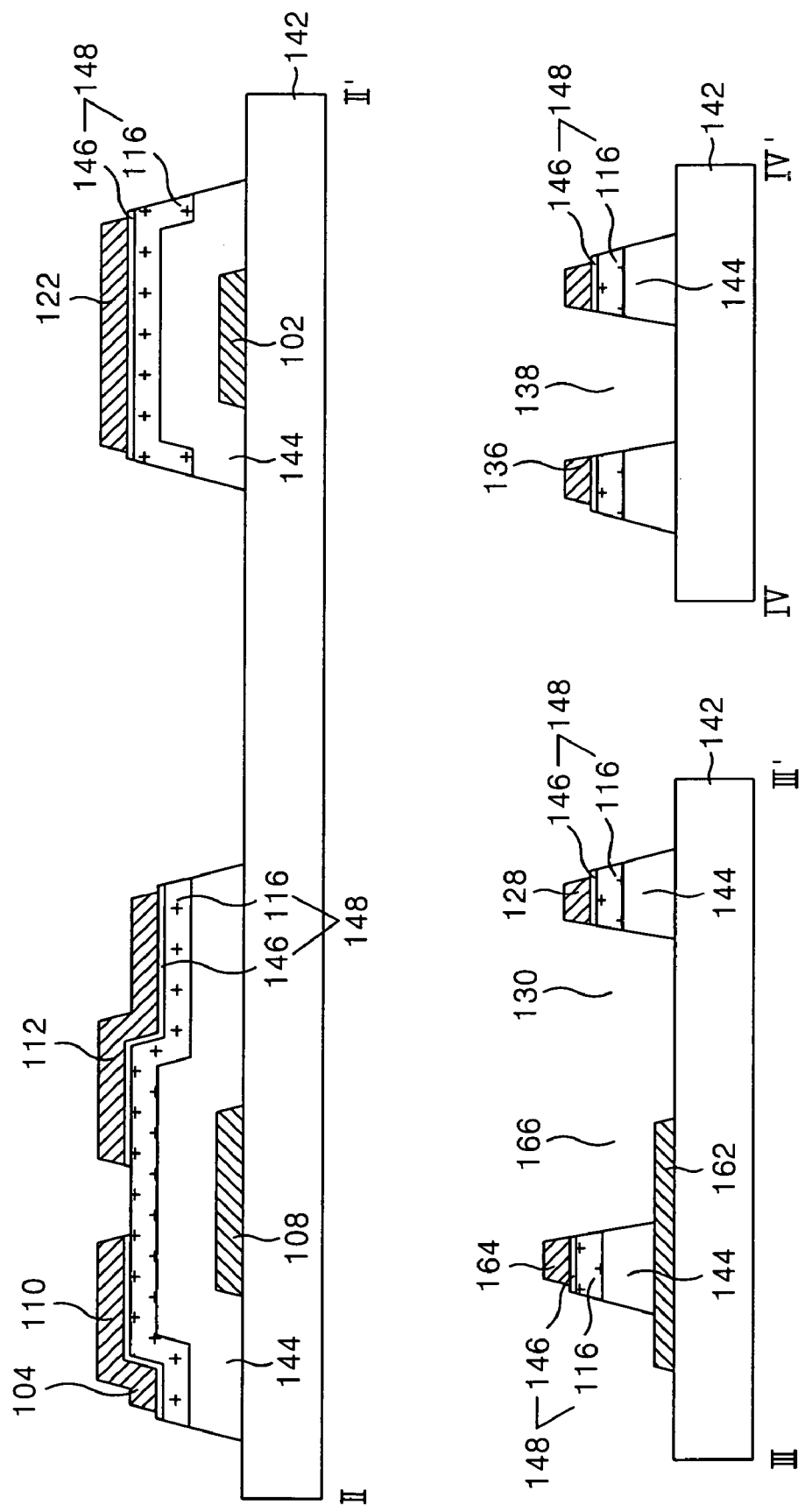

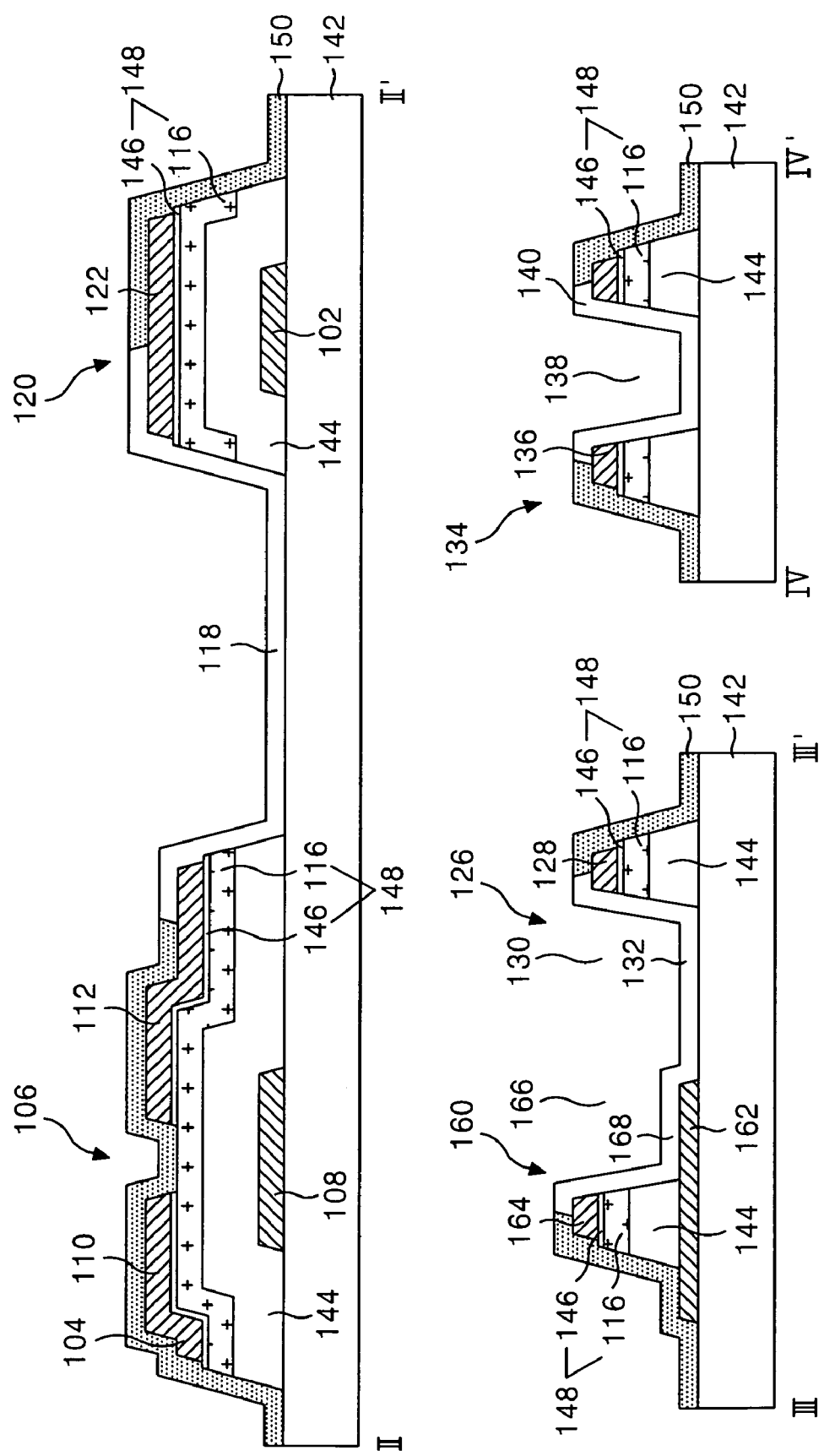

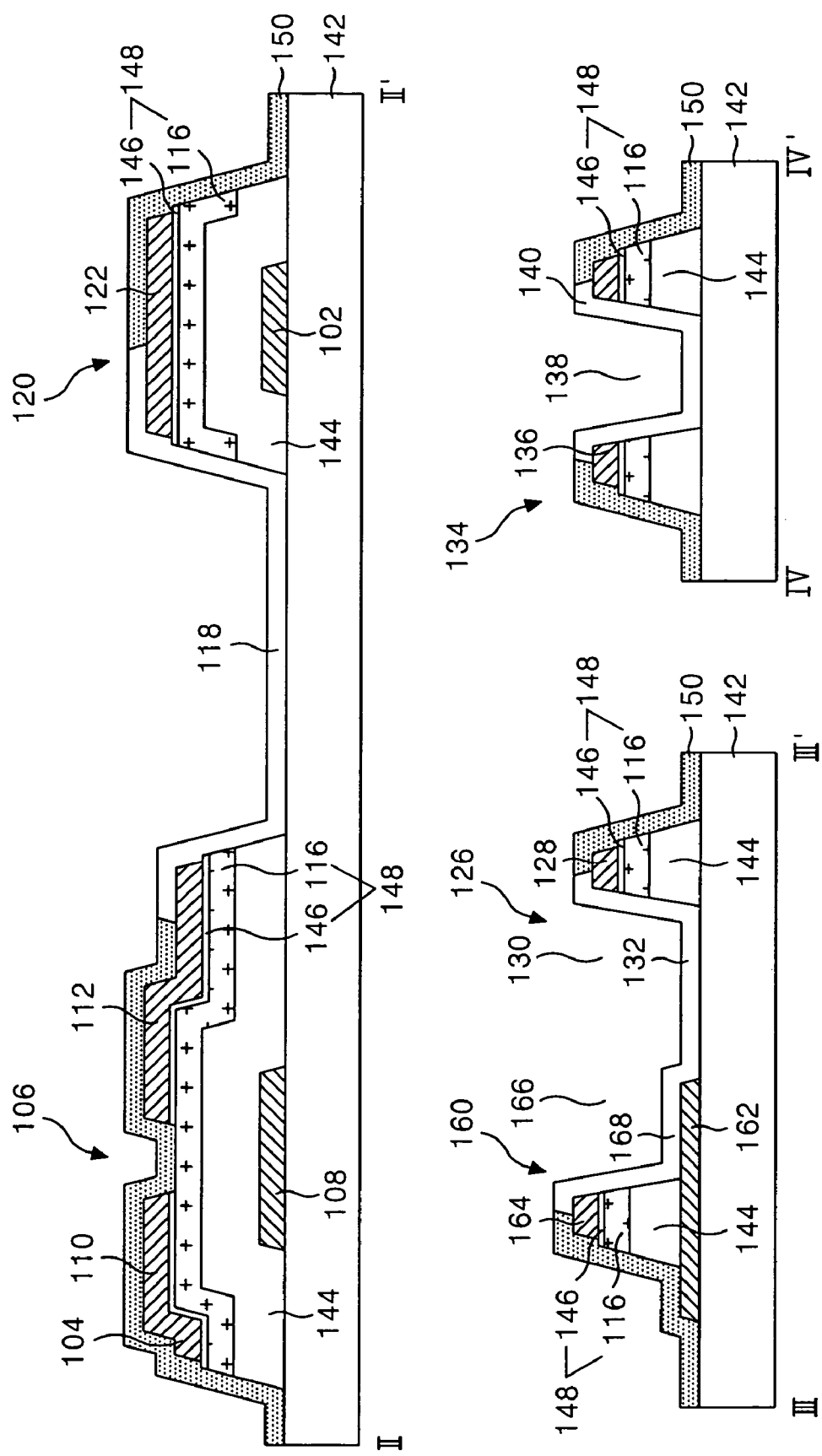

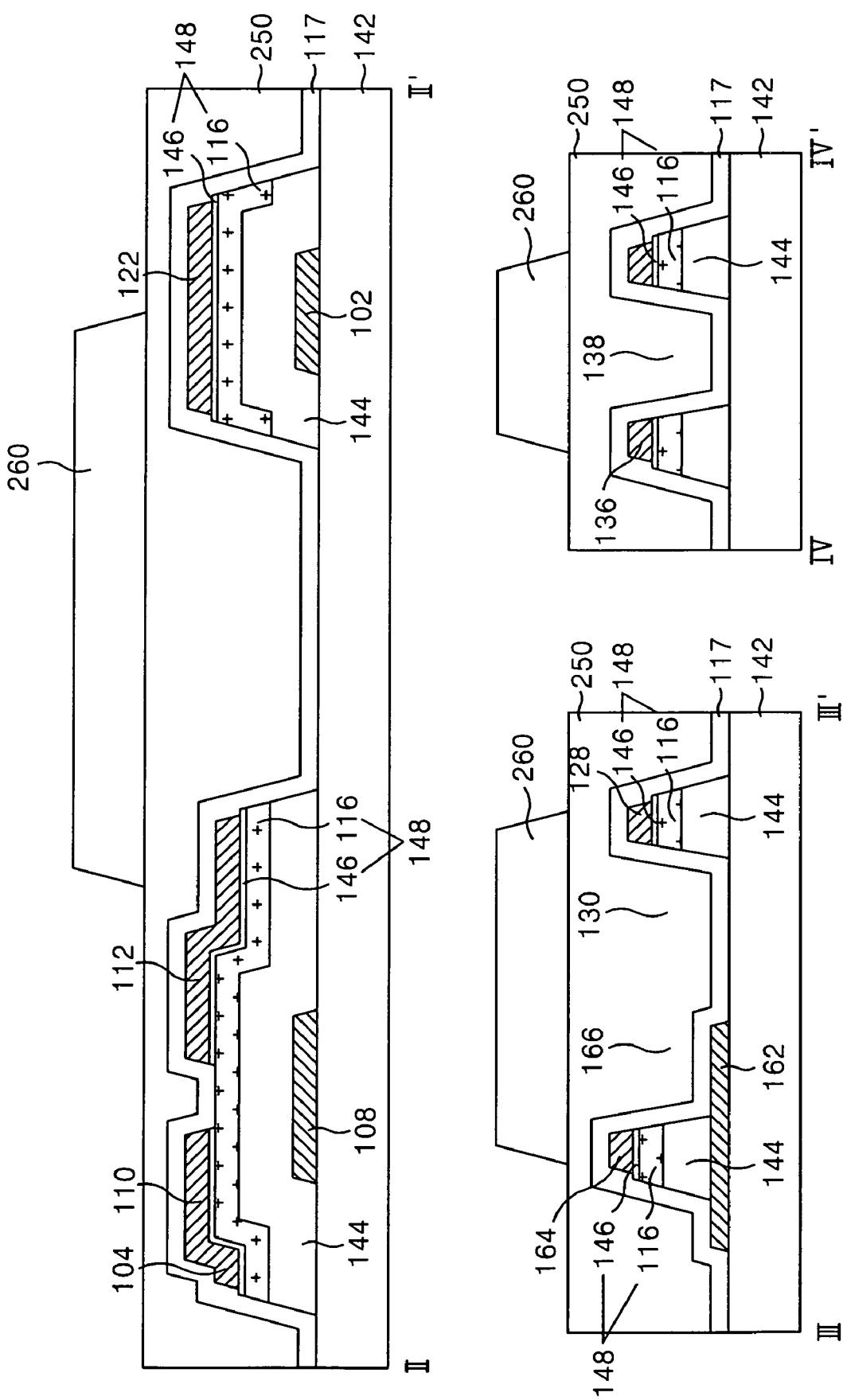

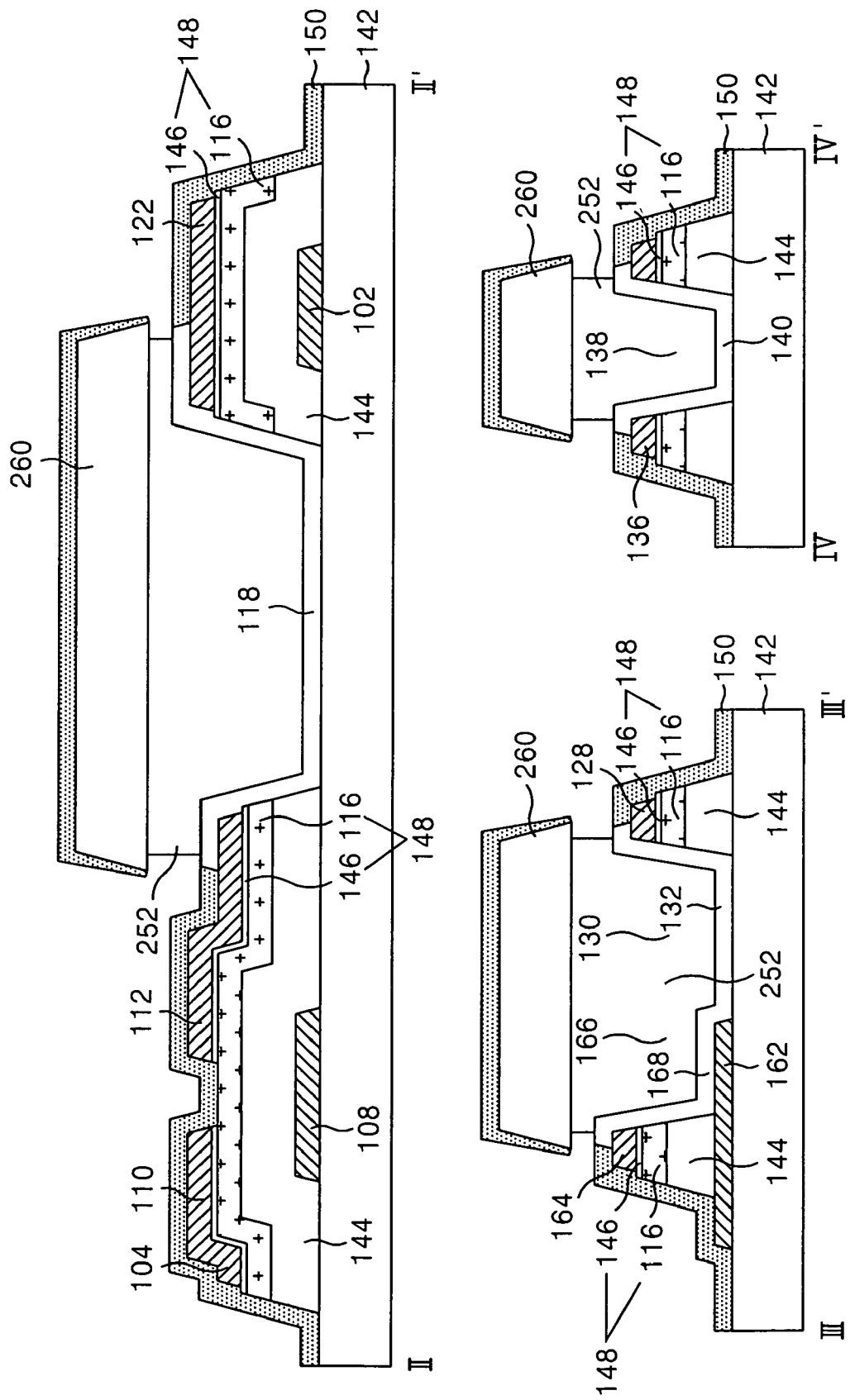

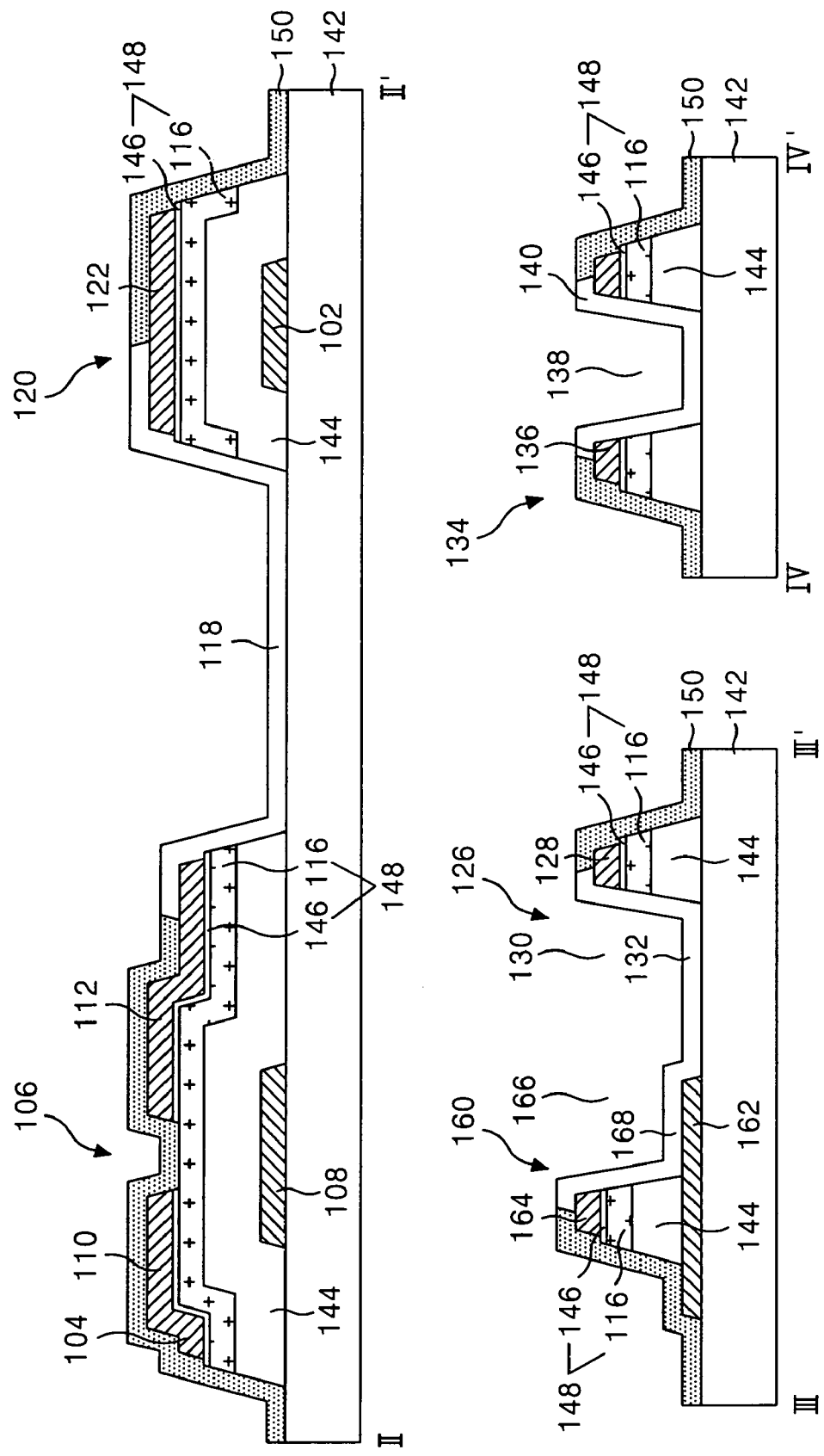

LIQUID CRYSTAL DISPLAY DEVICE AND METHOD FOR FABRICATING THE SAME

This application claims the benefit of the Korean Patent Application No. P2004-112581, filed on Dec. 24, 2004, which is hereby incorporated by reference for all purposes as if fully set forth herein.

BACKGROUND OF THE INVENTION

1. Field of the Invention

The present invention relates to a thin film transistor substrate applied to a display device and a fabricating method thereof, and more particularly to a thin film transistor substrate that may be fabricated using a simplified process, and a fabricating method thereof.

2. Discussion of the Related Art

A liquid crystal display device controls light transmittance of a liquid crystal having dielectric anisotropy using an electric field, thereby displaying a picture. The liquid crystal display includes a liquid crystal display panel for displaying a picture through a liquid crystal cell matrix, and a drive circuit for driving the liquid crystal display panel.

Referring to FIG. 1, a liquid crystal display panel of the related art includes a color filter substrate 10 and a thin film transistor substrate 20 that are bonded together with a liquid crystal 24 therebetween.

The color filter substrate 10 includes a black matrix 4, a color filter 6 and a common electrode 8 that are sequentially formed on an upper glass substrate 2. The black matrix 4 is formed on the upper glass substrate 2 in a matrix shape. The black matrix 4 divides areas of the upper glass substrate 2 into a plurality of cell areas where the color filter 6 is to be formed, and prevents a light interference between adjacent cells and an external light reflection. The color filter 6 is formed to be divided into red R, green G, and blue B in the cell areas divided by the black matrix 4 to transmit red, green, and blue light, respectively. The common electrode 8 supplies a common voltage Vcom, that becomes a standard when driving the liquid crystal 24, to a transparent conductive layer that is formed on the entire surface of the color filter 6. In order to level the color filter 6, an overcoat layer (not shown) might be further formed between the color filter 6 and the common electrode 8.

The thin film transistor substrate 20 includes a pixel electrode 22 and a thin film transistor 18 formed in each cell area defined by the crossing of a gate line 14 and a data line 16 on a lower glass substrate 12. The thin film transistor 18 supplies a data signal from the data line 16 to the pixel electrode 22 in response to a gate signal from the gate line 12. The pixel electrode 22 formed of a transparent conductive layer supplies the data signal from the thin film transistor 18, thereby driving a liquid crystal 24.

The liquid crystal having dielectric anisotropy rotates in accordance with an electric field formed by a common voltage Vcom of a common electrode 8 and the data signal of the pixel electrode 22 to control a light transmittance, thereby realizing gray levels.

The liquid crystal display panel further includes a spacer (not shown) to maintain a fixed cell gap between the color filter substrate 10 and the thin film transistor substrate 20.

The color filter substrate 10 and thin film transistor substrate 20 of the liquid crystal display panel are formed by use of a plurality of mask processes. One mask process includes a plurality of processes such as thin film depositing (coating), cleaning, photolithography (hereinafter, referred to as "photo process"), etching, photo-resist stripping, inspecting, etc.

Specially, the thin film transistor substrate includes a semiconductor process and requires a plurality of mask processes, thus its manufacturing process is complicated thus increasing the manufacturing unit price of the liquid crystal display panel. Accordingly, the thin film transistor substrate has been developed to reduce the number of mask processes.

SUMMARY OF THE INVENTION

Accordingly, the present invention is directed to a thin film transistor substrate and method for fabricating the same that substantially obviates one or more of the problems due to limitations and disadvantages of the related art.

An advantage of the present invention is to provide a thin film transistor substrate that may be fabricated using a simplified process, and a fabricating method thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device, including: a gate line on a substrate; a data line crossing the gate line to define a pixel area; a thin film transistor connected to the gate line and the data line; a semiconductor pattern extended from the thin film transistor to overlap along the data line; a gate insulating pattern that overlaps along the semiconductor pattern to insulate the gate line and the data line; a pixel electrode in the pixel area spaced apart from the gate line and the data line and connected to the thin film transistor; and a passivation film formed in an area where the pixel electrode is not present to form a border with the pixel electrode.

In another aspect of the present invention, a method of fabricating a liquid crystal display device, including: a first mask process of forming a gate line on a substrate and a gate electrode connected to the gate line; a second mask process of forming a source/drain metal pattern including a data line crossing the gate line to define a pixel area, a source electrode connected to the data line, a drain electrode facing the source electrode, a semiconductor pattern that overlaps along and under the source/drain metal pattern to form a channel between the source electrode and the drain electrode, and a gate insulating pattern that overlaps along and under the semiconductor pattern; and a third mask process of forming a pixel electrode in the pixel area connected to the drain electrode and spaced apart from the gate line and the data line, and forming a passivation film that forms a border with the pixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is a cross sectional diagram illustrating the thin film transistor substrate shown in FIG. 2, taken along the lines II-II', III-III', IV-IV';

FIGS. 4A and 4B are a plan view and a cross sectional diagram for explaining a first mask process of the thin film transistor substrate according to an embodiment of the present invention;

FIGS. 6A to 6E are cross sectional diagrams for specifically explaining the second mask process of the present invention;

FIGS. 7A and 7B are a plan view and a cross sectional diagram for explaining a third mask process of the thin film transistor substrate according to the embodiment of the present invention;

FIGS. 8A to 8E are cross sectional diagrams for specifically explaining a third mask process of the present invention; and FIGS. 9A to 9D are cross sectional diagrams for specifically explaining another third mask process of the present invention.

DETAILED DESCRIPTION OF THE ILLUSTRATED EMBODIMENT

Reference will now be made in detail to embodiments of the present invention, examples of which are illustrated in the accompanying drawings.

With reference to FIGS. 2 to 9D, embodiments of the present invention will be explained as follows.

Figure 1:
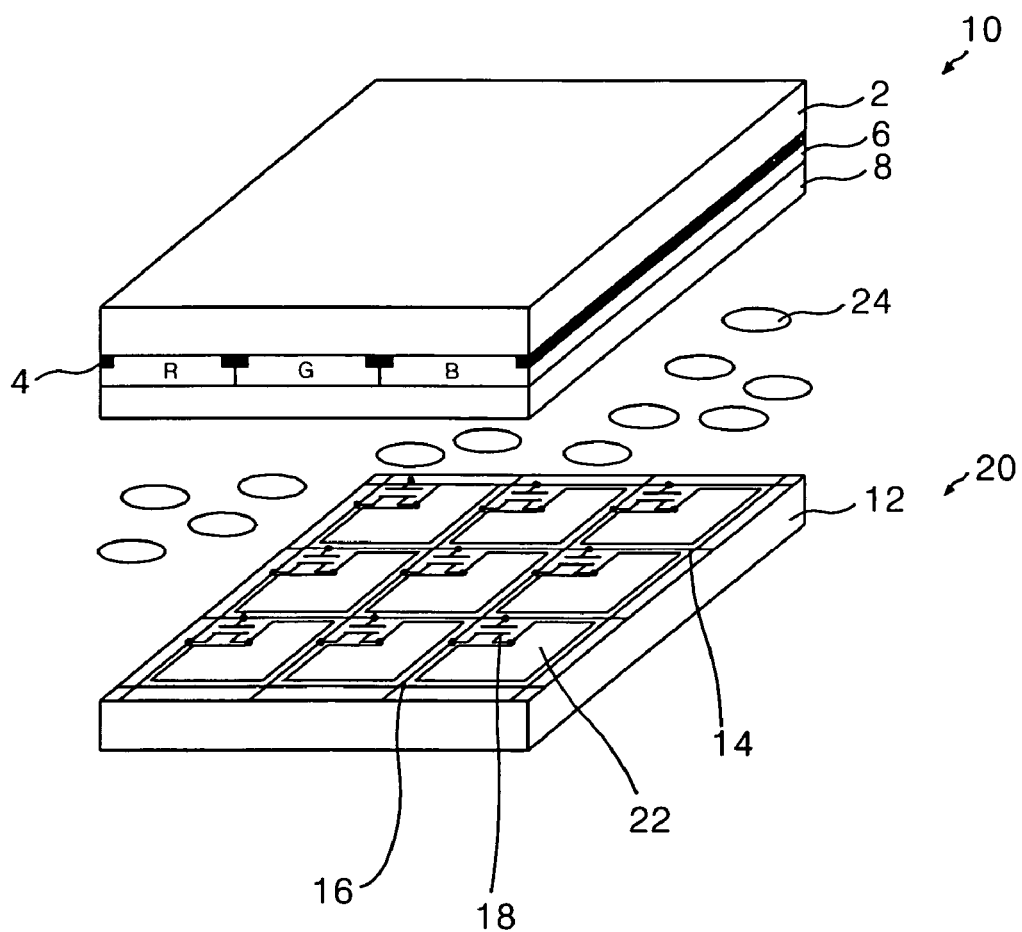
FIG. 1 is a perspective view briefly illustrating a liquid crystal display panel structure of the related art.
Figure 2:
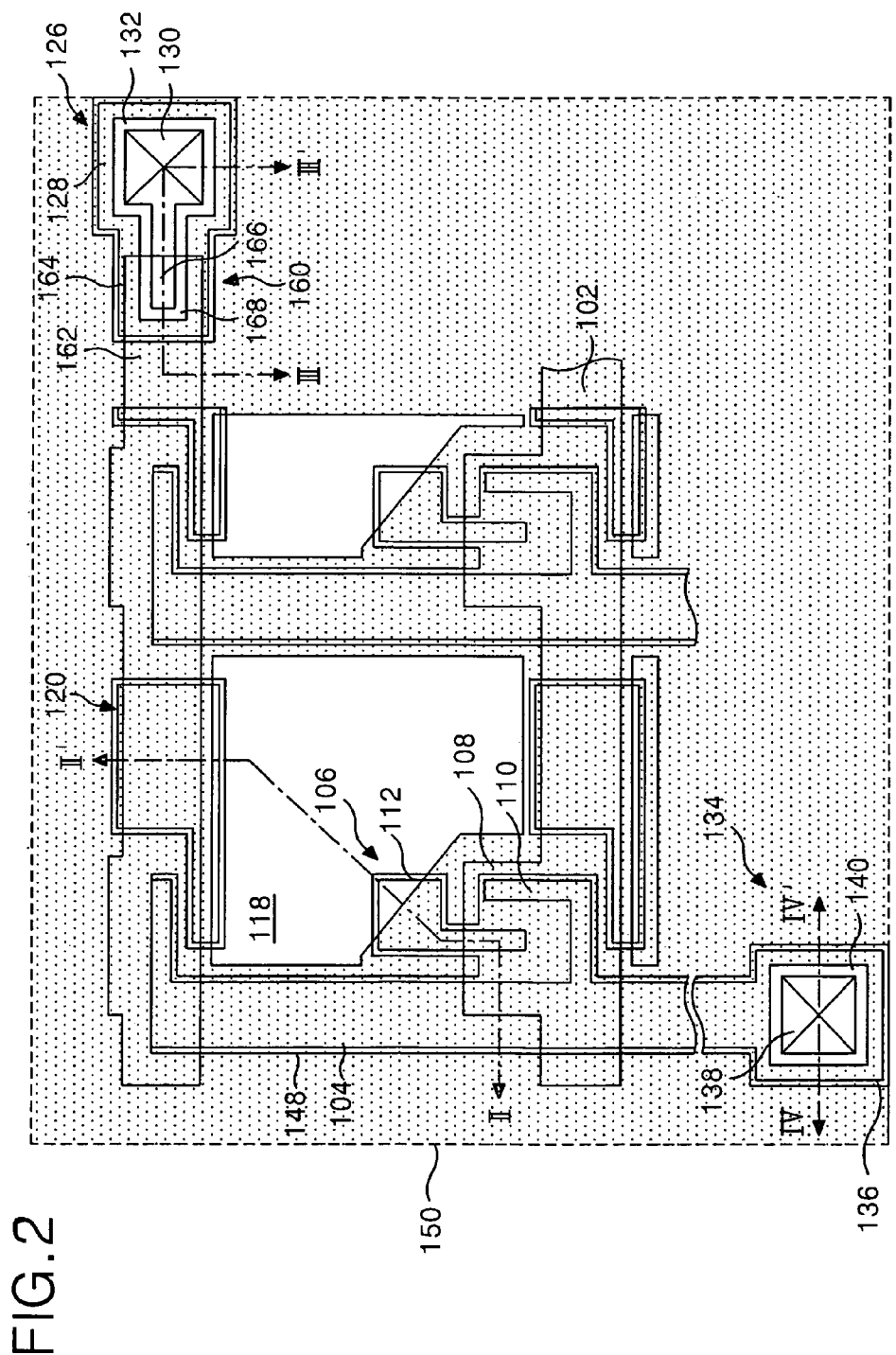
FIG. 2 is a plan view illustrating a part of a thin film transistor substrate according to an embodiment of the present invention.

FIG. 2 is a plan view illustrating a thin film transistor substrate according to an embodiment of the present invention, and FIG. 3 is a cross sectional diagram illustrating the thin film transistor substrate shown in FIG. 2, taken along the lines II-II', III-III' and IV-IV'.

The thin film transistor substrate shown in FIGS. 2 and 3 includes: a gate line 102 and a data line 104 that are formed to cross each other with a gate insulating pattern 144 therebetween on a lower substrate 142, a thin film transistor 106 that is adjacent to the crossing area thereof; and a pixel electrode 118 formed in a pixel area defined by the crossing structure. The thin film transistor substrate further includes: a storage capacitor 120 formed by the gate line 102 overlapping a storage upper electrode 122 connected to the pixel electrode 118; a gate pad 126 connected to the gate line 102; and a data pad 134 connected to the data line 104.

The thin film transistor 106 receives a pixel signal applied to the data line 104 to be charged and sustained in the pixel electrode 118 in response to a scan signal applied to the gate line 102. The thin film transistor 106 includes: a gate electrode 108 connected to the gate line 102; a source electrode 110 connected to the data line 104; a drain electrode 112 connected to the pixel electrode 118 while facing the source electrode 110; an active layer 116 that overlaps the gate electrode 108 with a gate insulating pattern 144 therebetween to form a channel between the source electrode 110 and the drain electrode 112; and an ohmic contact layer 146 formed on the active layer 116 except over a channel region to be in ohmic contact with the source electrode 110 and the drain electrode 112.

A semiconductor pattern 148 including the active layer 116 and the ohmic contact layer 146 is formed to overlap the data line 104 in the process.

The gate insulating pattern 144 is formed together with the semiconductor pattern 148, thus it exists only under the semiconductor pattern 148.

The pixel electrode 118 connected to the drain electrode 112 and storage upper electrode 122 is formed in the pixel area defined by the crossing of the gate line 102 and the data line 104. The pixel electrode 118 is formed to be spaced apart from the gate line 102 and the data line 104 and to overlap a part of the storage upper electrode 122 and the drain electrode 112 which projects into the pixel area. Accordingly, it forms a border within the pixel area with a passivation film 50 that covers the thin film transistor 106 and the gate line 102 and data line 104. The pixel electrode 118 is charged with the pixel signal supplied from the thin film transistor 106 to generate a potential difference with a common electrode formed in the color filter substrate (not shown). The potential difference causes the liquid crystal located in the thin film transistor substrate and the color filter substrate to rotate by dielectric anisotropy to control the amount of the light that is incident from a light source (not shown) through the pixel electrode 118, thereby transmitting the light to the color filter substrate.

The storage upper electrode 122 connected to the pixel electrode 118 overlaps the gate line 102 with the semiconductor pattern 148 and the gate insulating pattern 144 therebetween, thereby forming the storage capacitor 120 in a storage-on-gate structure. The semiconductor pattern 148 and the gate insulating pattern 144 having the same pattern as the storage upper electrode 122 are formed to encompass the gate line 102 with a line width wider than the gate line 102. The storage capacitor 120 receives the pixel signal to be charged on the pixel electrode 118 to be stably maintained.

The gate line 102 receives the scan signal from the gate driver (not shown) through the gate pad 126. The gate pad 126 includes: a gate pad lower electrode 128 connected to the gate line 102 through a gate link 160; a first contact hole 130 penetrating the gate pad lower electrode 128 and the semiconductor pattern 148 and gate insulating pattern 144 thereunder; and a gate pad upper electrode 132 formed to overlap the gate pad lower electrode 128 through the first contact hole 130 to be connected to the gate pad lower electrode 128. The gate pad upper electrode 132 forms a border on the gate pad lower electrode 128 with the passivation film 150 that covers the neighboring part of the gate pad lower electrode 128.

The gate pad 126 is connected to the gate line 102 through the gate link 160. The gate link 160 includes: a first gate link 162 extended from the gate line 102; a second gate link 164 extended from the gate pad lower electrode 128 together with the semiconductor pattern 148 and gate insulating pattern 144 thereunder to partially overlap the first gate link 162; and a contact electrode 168 which connects the first gate link 162 to the second gate link 164 through the second contact hole 166. Herein, the second contact hole 166 is integrated with the first contact hole 130 and penetrates the second gate link 164, the semiconductor pattern 148 and the gate insulating pattern 144 to expose the first gate link 162. The contact electrode 168 integrated with the gate pad upper electrode 132 is formed to overlap the second gate link 164 through the second contact hole 166 to connect the exposed first and second gate links 162 and 164. The contact electrode 168 forms a border on the second gate link 164 with the passivation film that covers the neighboring part of the second gate link 164. Herein, the second contact hole 166 has a structure integrated with the first contact hole 130, but it might be formed to be separate from the first contact hole 130. Further, the contact electrode 168 also has a structure of being integrated with the gate pad upper electrode 132, but it might be formed to be separated from the gate pad upper electrode 132.

The data line 104 receives the pixel signal from a data driver (not shown) through the data pad 134. The data pad 134 includes: a data pad lower electrode 136 extended from the data line 104 together with the semiconductor pattern 148 and gate insulating pattern 144 thereunder; a third contact hole 138 penetrating from the data pad lower electrode 136 to the gate insulating pattern 144; and a data pad upper electrode 140 formed to overlap the data pad lower electrode 136 through the third contact hole 138 to be connected to the data pad lower electrode 136. The data pad upper electrode 140 forms a border on the data pad lower electrode 136 with the passivation film 150 that covers the neighboring part of the data pad lower electrode 136.

In this way, in the thin film transistor substrate according to the present invention, the transparent conductive pattern including the pixel electrode 118, the gate pad upper electrode 132, the contact electrode 168, and the data pad upper electrode 140 is formed to form a border with a side surface of the passivation film 150. In other words, the passivation film 150 is formed in a remaining area where the transparent conductive pattern is not present to protect the patterns formed thereunder. This is because the passivation film 150 is patterned by lifting off the photo-resist pattern after forming the passivation film 150 when forming the transparent conductive pattern. As the transparent conductive pattern is formed before the passivation film 150 is formed in this way, it is possible to prevent the transparent conductive pattern and a lower metal layer, i.e., a source/drain metal pattern, from being opened.

The gate pad 126 and the data pad 134 may be formed in the same structure in the thin film transistor substrate according to the present invention.

The thin film transistor substrate of the present invention is formed by three mask processes as follows.

Figure 4B:
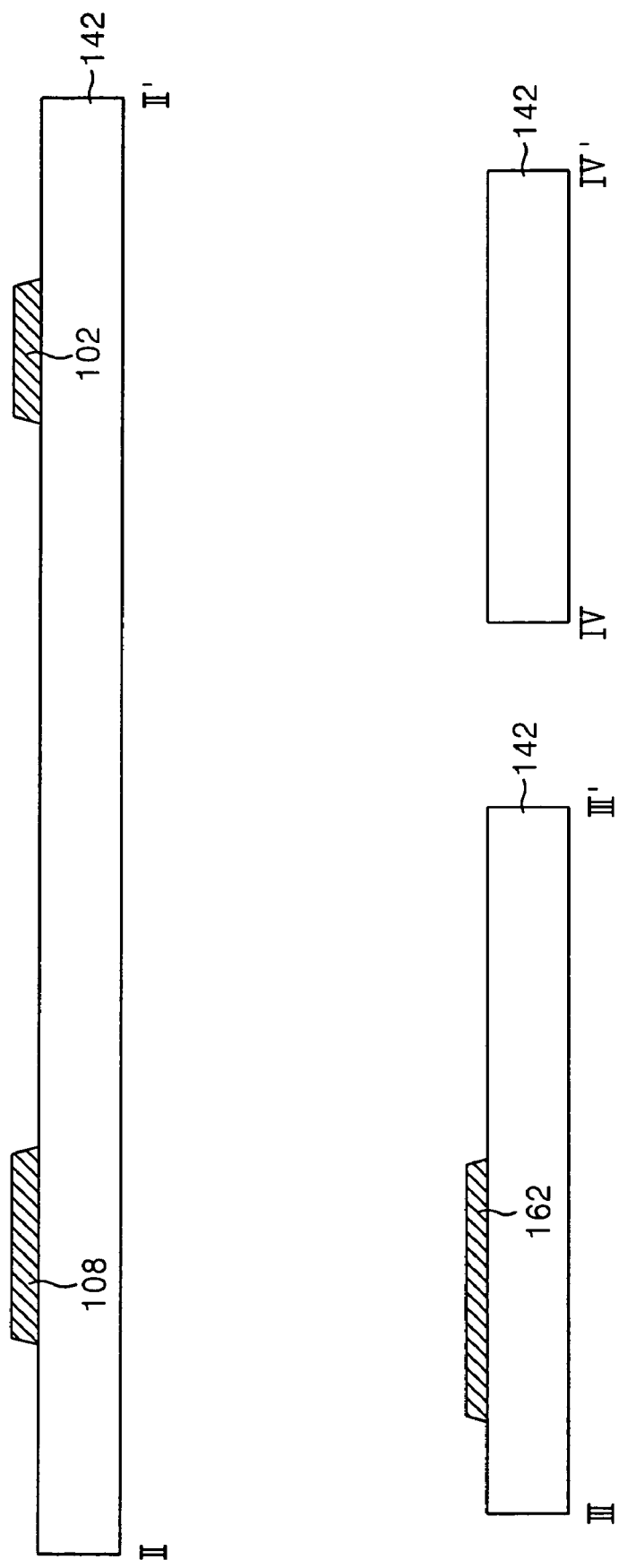

FIGS. 4A and 4B illustrate a plan view and a cross sectional diagram for explaining a first mask process in a fabricating method of a thin film transistor substrate according to an embodiment of the present invention.

A gate metal pattern including the gate line 102, the gate electrode 108, and the first gate link 162 is formed on the lower substrate 142 by a first mask process.

Specifically, a gate metal layer is formed on the lower substrate 142 by a deposition method such as sputtering. The gate metal layer may be formed in a single layer of a metal material such as Mo, Ti, Cu, AlNd, Al, Cr, Mo alloy, Cu alloy, Al alloy, etc., or in a double or more layered structure are deposited such as Al/Cr, Al/Mo, Al(Nd)/Al, Al(Nd)/Cr, Mo/Al(Nd)Mo, Cu/Mo, Ti/Al(Nd)/Ti, Mo/Al, Mo/Ti/Al(Nd), Cu alloy/Mo, Cu alloy/Al, Cu alloy/Mo alloy, Cu alloy/Al alloy, Al/Mo alloy, Mo alloy/Al, Al alloy/Mo alloy, Mo alloy/Al alloy, Mo/Al alloy, etc. Subsequently, the gate metal layer is patterned by a photolithography process and an etching process using a first mask, thereby forming the gate metal pattern including the gate line 102, the gate electrode 108 connected to the gate line 102, and the first gate link 162.

Figure 5A:
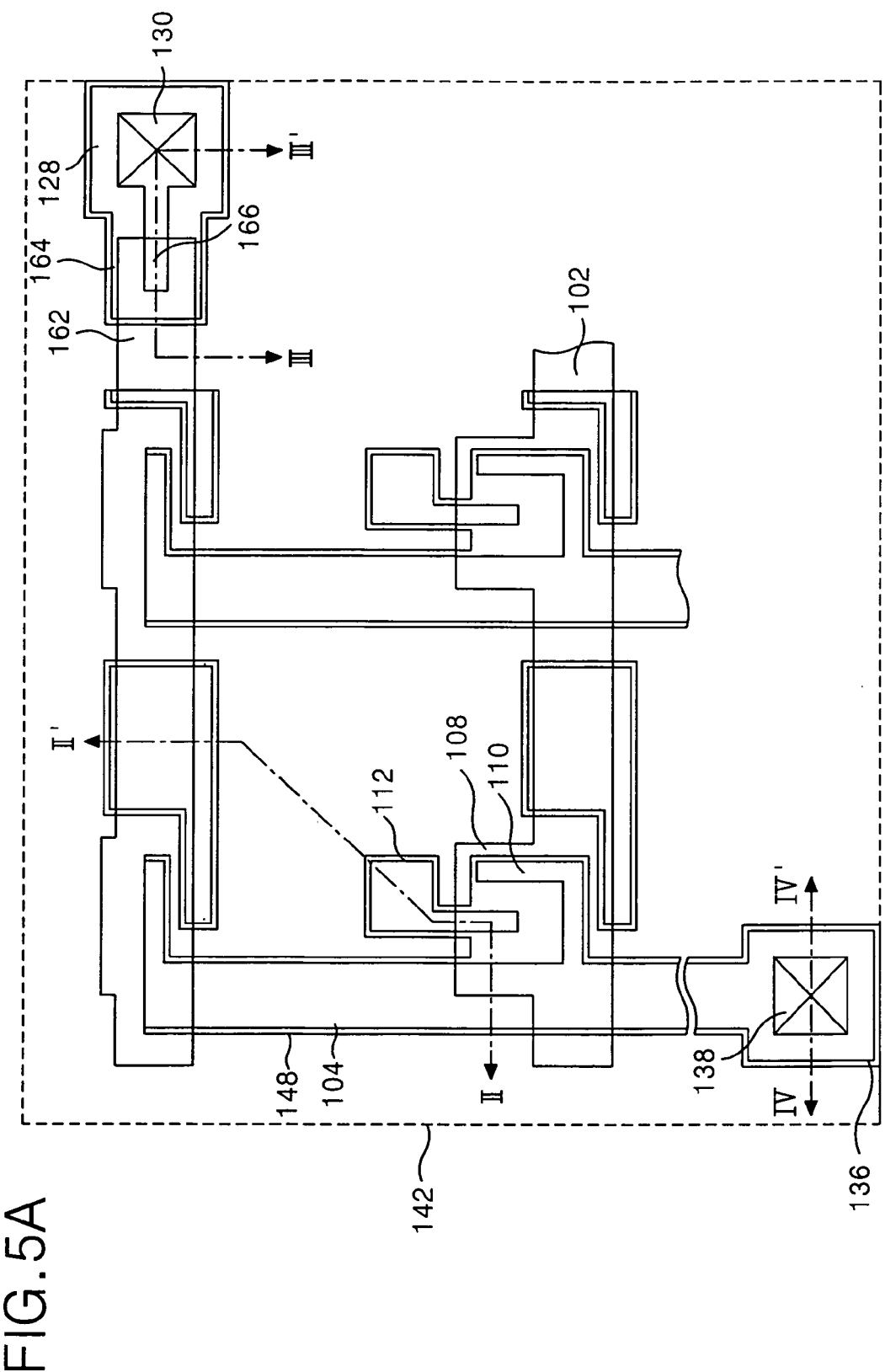
FIGS. 5A and 5B are a plan view and a cross sectional diagram for explaining a second mask process of the thin film transistor substrate according to an embodiment of the present invention.
Figure 5B:
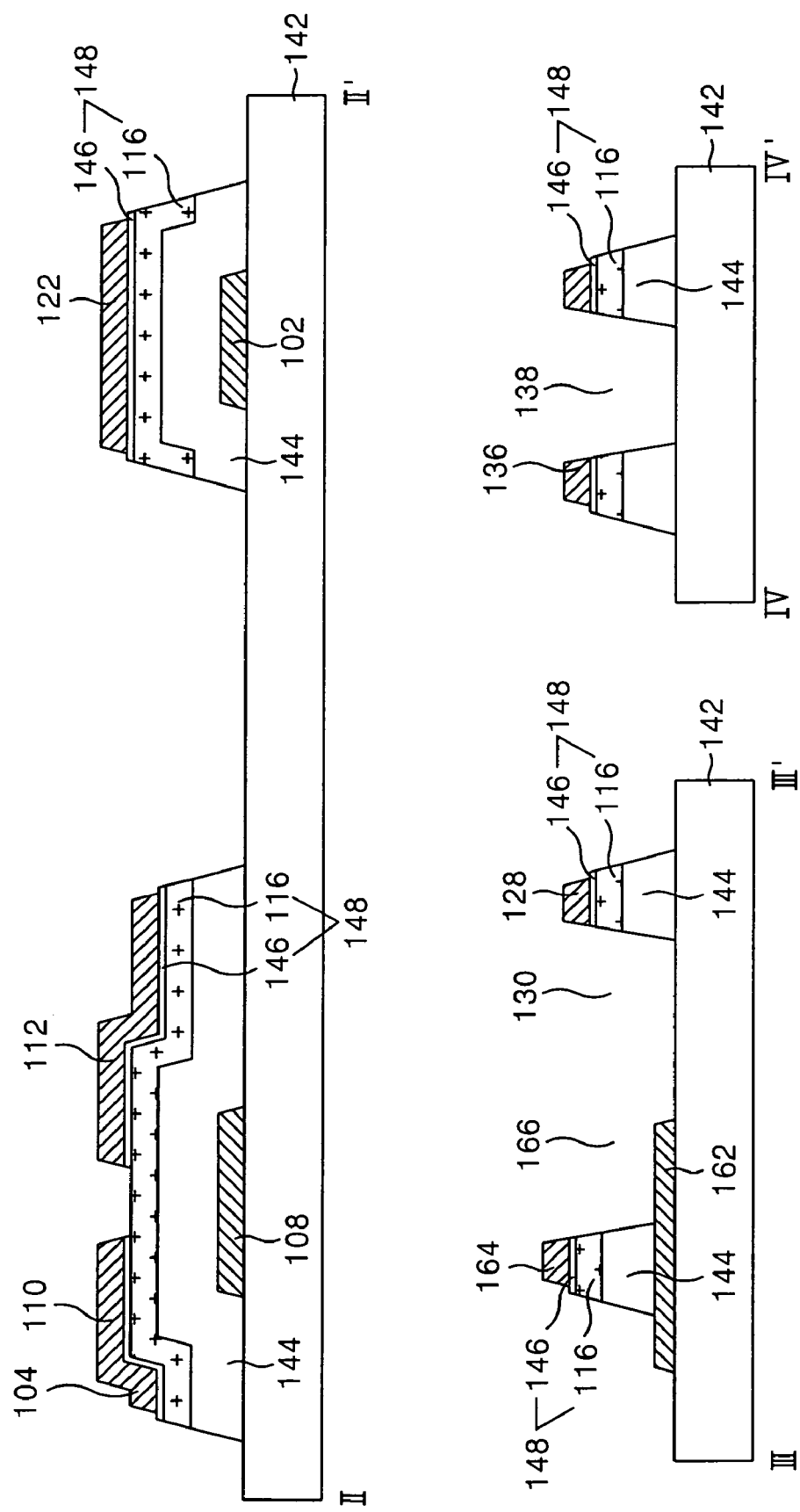

FIGS. 5A and 5B illustrate a plan view and cross sectional diagram for explaining a second mask process in the fabricating method of the thin film transistor substrate according to the embodiment of the present invention, and FIGS. 6A to 6E illustrate cross sectional diagrams for specifically explaining the second mask process.

The gate insulating pattern 144, the semiconductor pattern 148, and the source/drain metal pattern are deposited and first to third contact holes 130, 166, 138 are formed by the second mask process on the lower substrate 142 where the gate metal pattern is formed by the first mask process. The semiconductor pattern 148 includes the active layer 116 and the ohmic contact layer 146 that are deposited on the gate insulating pattern 144, and the source/drain metal pattern includes the data line 104, the source electrode 110, the drain electrode 112, the storage electrode 122, the data pad lower electrode 136, the gate pad lower electrode 128, and the second gate link 164 that overlap the semiconductor pattern 148. The gate insulating pattern 144, the semiconductor pattern 148, and the source/drain metal pattern are formed by one mask process using a diffractive exposure mask or a halftone mask. Hereinafter, only the case of using the diffractive exposure mask will be used as an example.

Figure 6A:
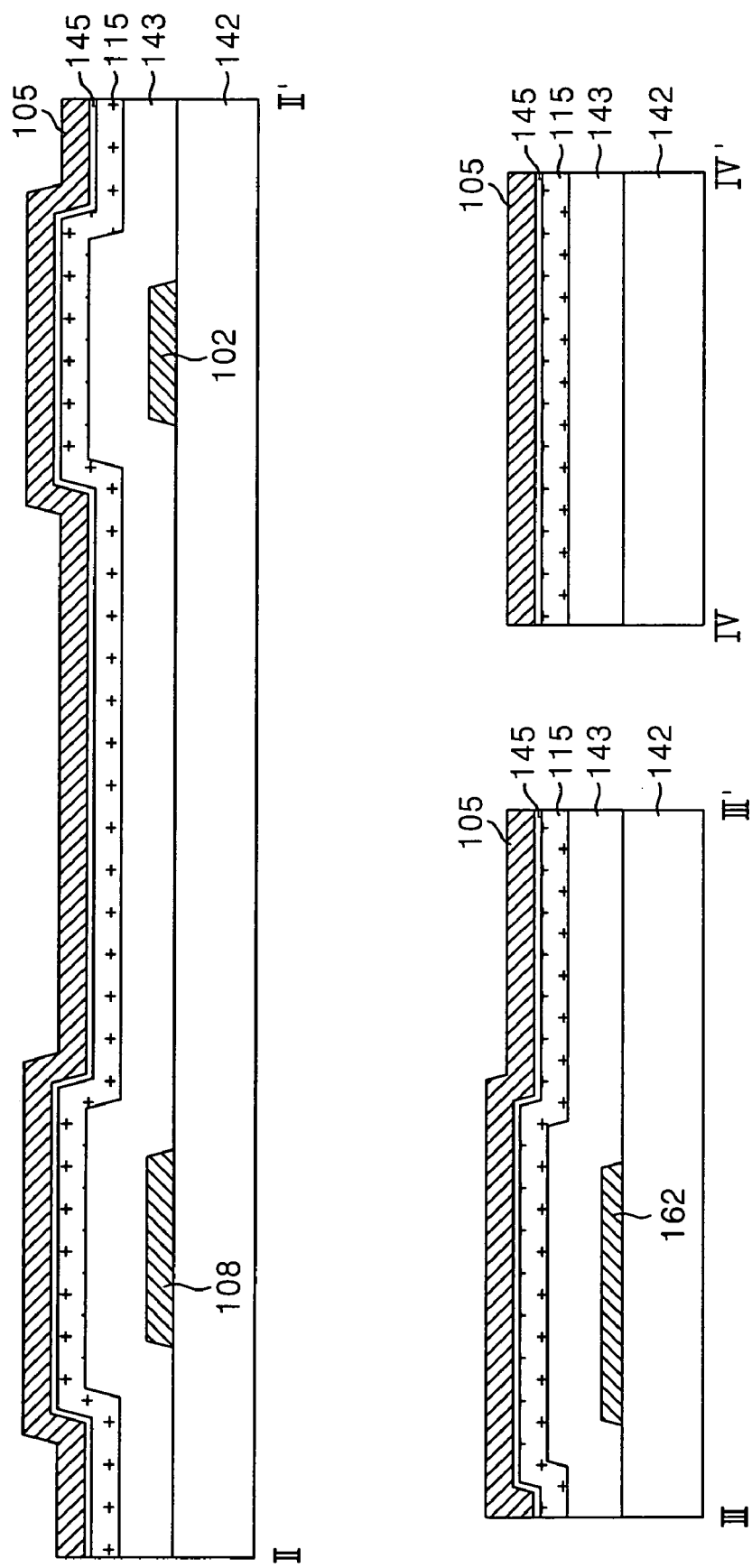

Referring to FIG. 6A, a gate insulating film 143, an amorphous silicon layer 115, an amorphous silicon layer doped with impurities (n+ or p+) 145, and a source drain metal layer 105 are sequentially formed on the lower substrate 142 where the gate pattern is formed. For example, the gate insulating film 143, the amorphous silicon layer 115, and the amorphous silicon layer doped with impurities (n+ or p+) 145 may be formed by a PECVD method, and the source/drain metal layer 105 may be formed by a sputtering method. The gate insulating film 143 may be formed of an inorganic insulating material such as silicon oxide SiOx, silicon nitride SiNx, etc. The source/drain metal layer 105 may be formed in a single layer of a metal material such as Mo, Ti, Cu, AlNd, Al, Cr, Mo alloy, Cu alloy, Al alloy, etc. or in a structure with two or more layers may be deposited such as Al/Cr, Al/Mo, Al(Nd)/Al, Al(Nd)/Cr, Mo/Al(Nd)Mo, Cu/Mo, Ti/Al(Nd)/Ti, Mo/Al, Mo/Ti/Al(Nd), Cu alloy/Mo, Cu alloy/Al, Cu alloy/Mo alloy, Cu alloy/Al alloy, Al/Mo alloy, Mo alloy/Al, Al alloy/Mo alloy, Mo alloy/Al alloy, Mo/Al alloy, etc.

Referring to FIG. 6B, a photo-resist pattern 220 having a step difference is formed by a photolithography process using a diffractive exposure mask. The diffractive exposure mask includes a shielding area that blocks ultraviolet rays, a diffractive area that defracts the ultraviolet rays by use of a slit, and a transmission area that passes all the ultraviolet rays. The photo-resist pattern 220 having an aperture and photo-resist patterns 220A, 220B having different widths from each other are formed by the photolithography process using the diffractive exposure mask. The relatively thick photo-resist pattern 220A is formed corresponding to a shielding area P1 of the photo-resist that is the shielding area of the diffractive exposure mask. The photo-resist pattern 220B that is thinner than the photo-resist pattern 220A is formed corresponding to a diffractive exposure area P2 that is the diffractive area, and the aperture part is formed corresponding to a full exposure area P3 that is the transmission part.

Referring to FIG. 6C, the source/drain metal layer 105 to the gate insulating film 143 is patterned by an etching process using the photo-resist pattern 220 having the step difference, thereby forming the source/drain metal pattern and the semiconductor pattern 148 and gate insulating pattern 144 thereunder, and forming the first to third contact holes 130, 166, 138. The source/drain metal pattern includes: the data line 104; the source electrode 110 and data pad lower electrode 136 connected to the data line 104; the storage upper electrode 122 that overlaps the gate line 102; the drain electrode 112 integrated with the source electrode 110; the data pad lower electrode 136; the second gate link 164 that is to be connected to the first gate link 162, and the gate pad lower electrode 128 connected to the second gate link 164. Herein, the storage upper electrode 122 overlaps the gate line 102 with the semiconductor pattern 148 and gate insulating pattern 144 therebetween to form the storage capacitor 120. The first to third contact holes 130, 166, 138 penetrate through gate insulating pattern 144 to the source/drain metal pattern, i.e., gate pad lower electrode 128, the second gate link 164, and the data pad lower electrode 136 respectively.

Referring to FIG. 6D, the photo-resist pattern 220 is ashed by an ashing process using oxygen $O_2$ plasma, thereby thinning the photo-resist pattern 220A and removing the photo-resist pattern 220B. Subsequently, the source/drain metal pattern exposed by removing the photo-resist pattern 220B and the ohmic contact layer 146 thereunder are removed by the etching process using the ashed photo-resist pattern 220A, thereby separating the source electrode 110 and the drain electrode 112 and exposing the active layer 116 resulting in a channel region.

Referring to FIG. 6E, the photo-resist pattern 220A remaining on the source/drain metal pattern in FIG. 6D is removed by a stripping process.

Figure 7A:
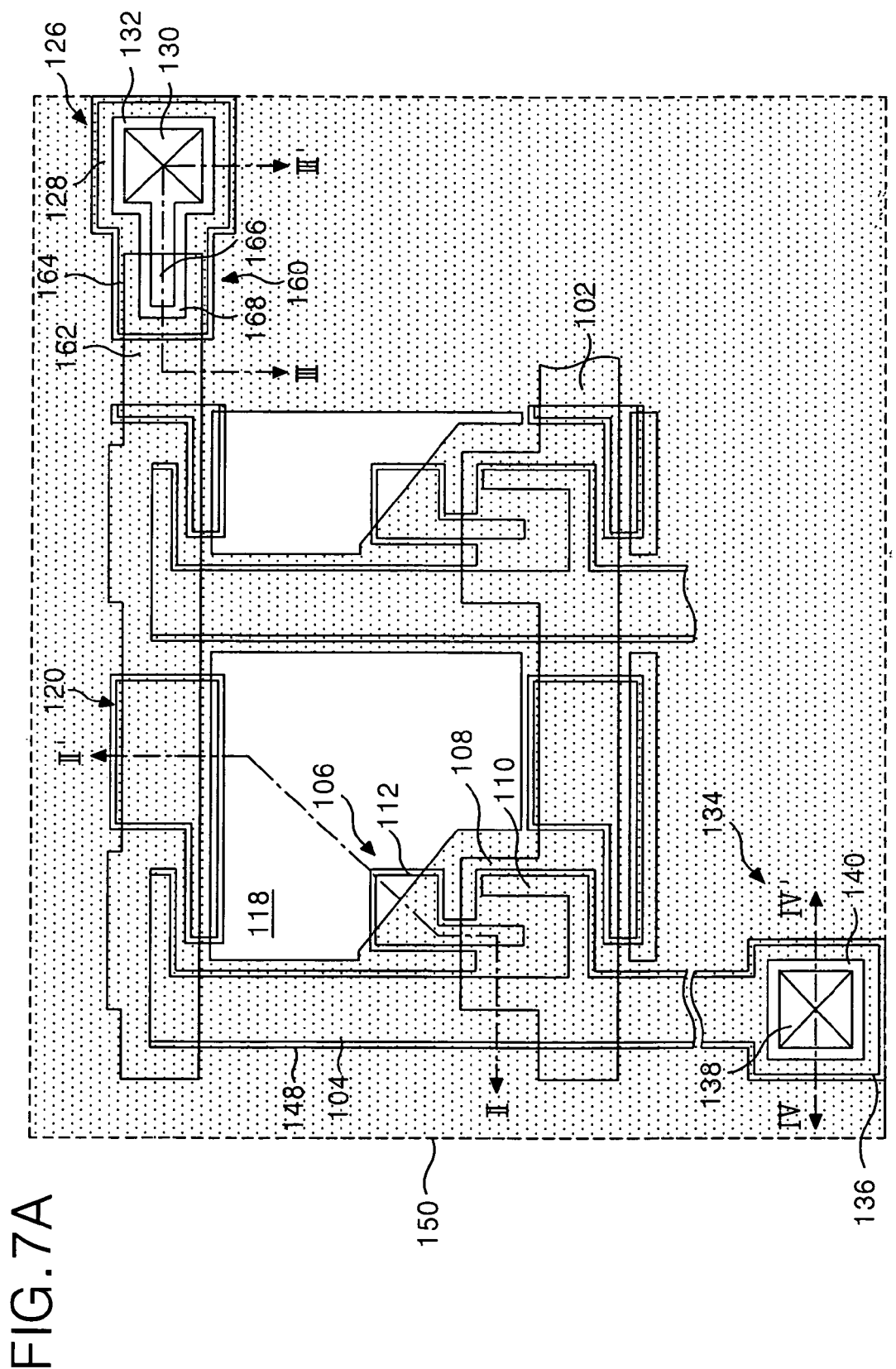

FIGS. 7A and 7B illustrate a plan view and cross sectional diagram for explaining a third mask process of the fabricating method of the thin film transistor substrate according to the present invention, and FIGS. 8A to 8D illustrate cross sectional diagrams for specifically explaining the third mask process.

A transparent conductive pattern including of the pixel electrode 118, the gate pad upper electrode 132, the contact electrode 168, and the data pad upper electrode 140 is formed by a third mask process, and the passivation film 150 is formed to form a border with the transparent conductive pattern.

Figure 8A:
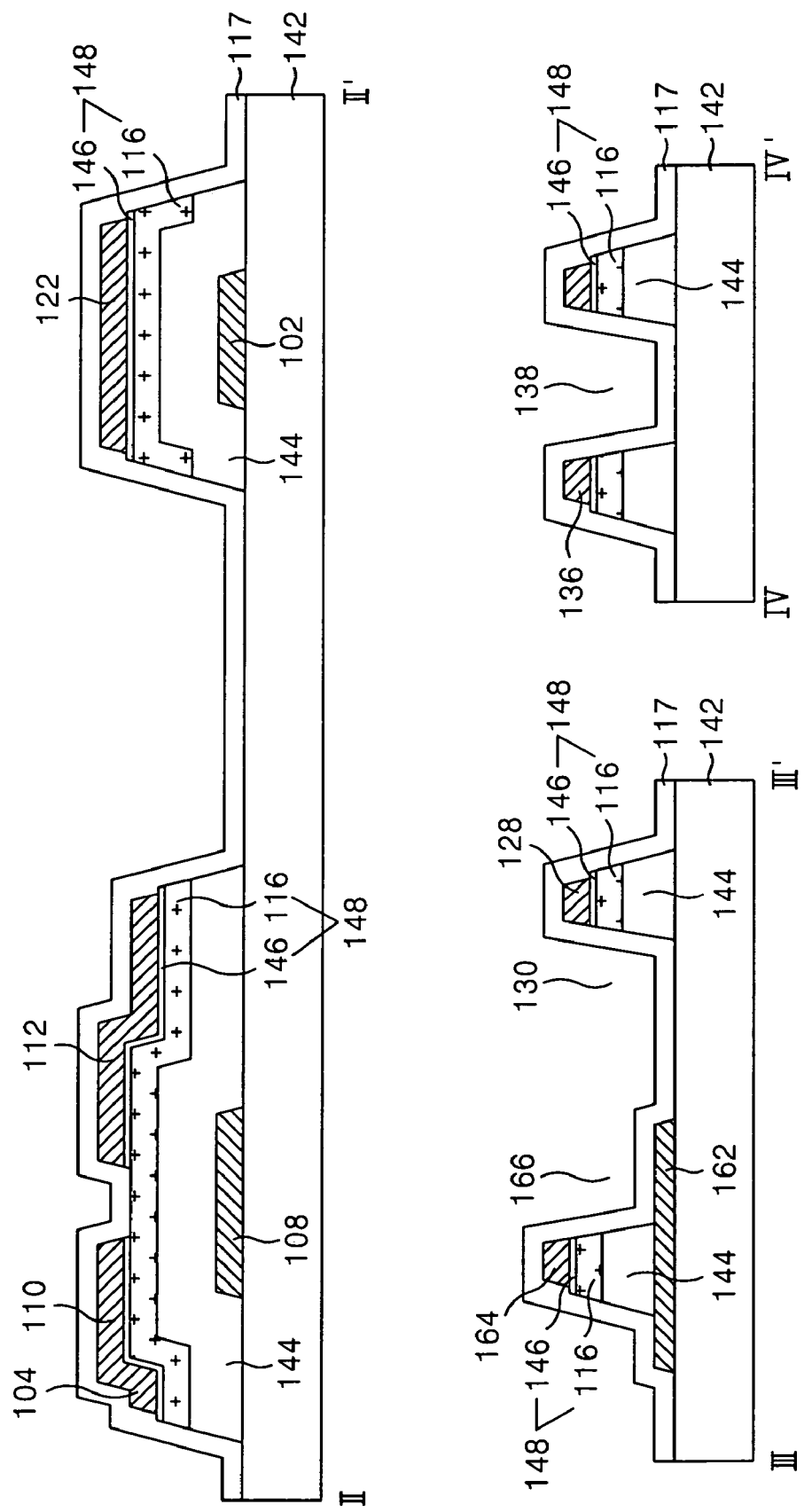

Referring to FIG. 8A, a transparent conductive film 117 is formed on a gate insulating pattern 114 where the source/drain metal pattern is formed, by a deposition method such as sputtering. The transparent conductive film 117 may be formed of ITO, TO, IZO, ITZO, etc.

Figure 8B:
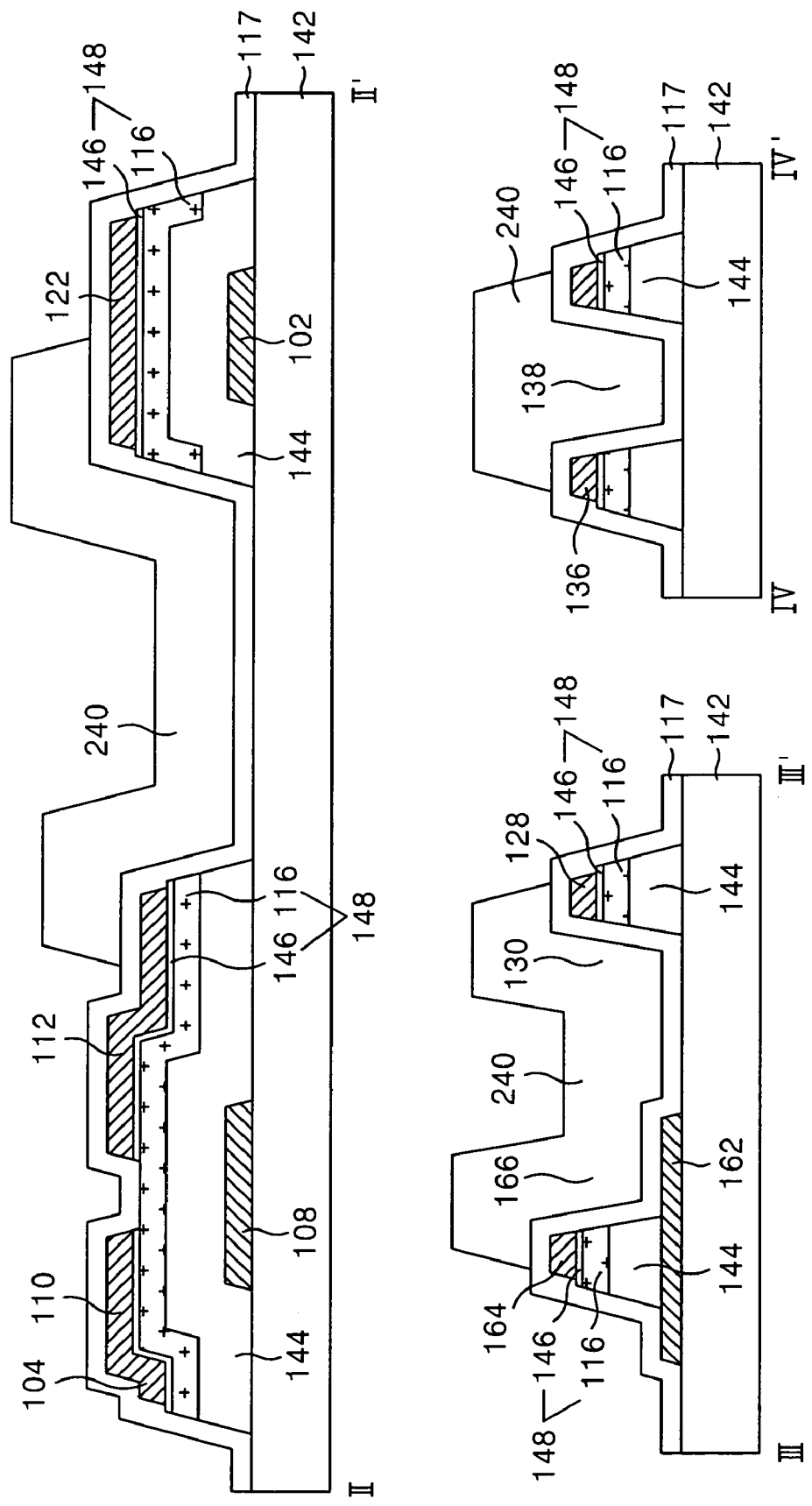

Referring to FIG. 8B, a photo-resist pattern 240 is formed by a photolithography process using the third mask.

Figure 8C:
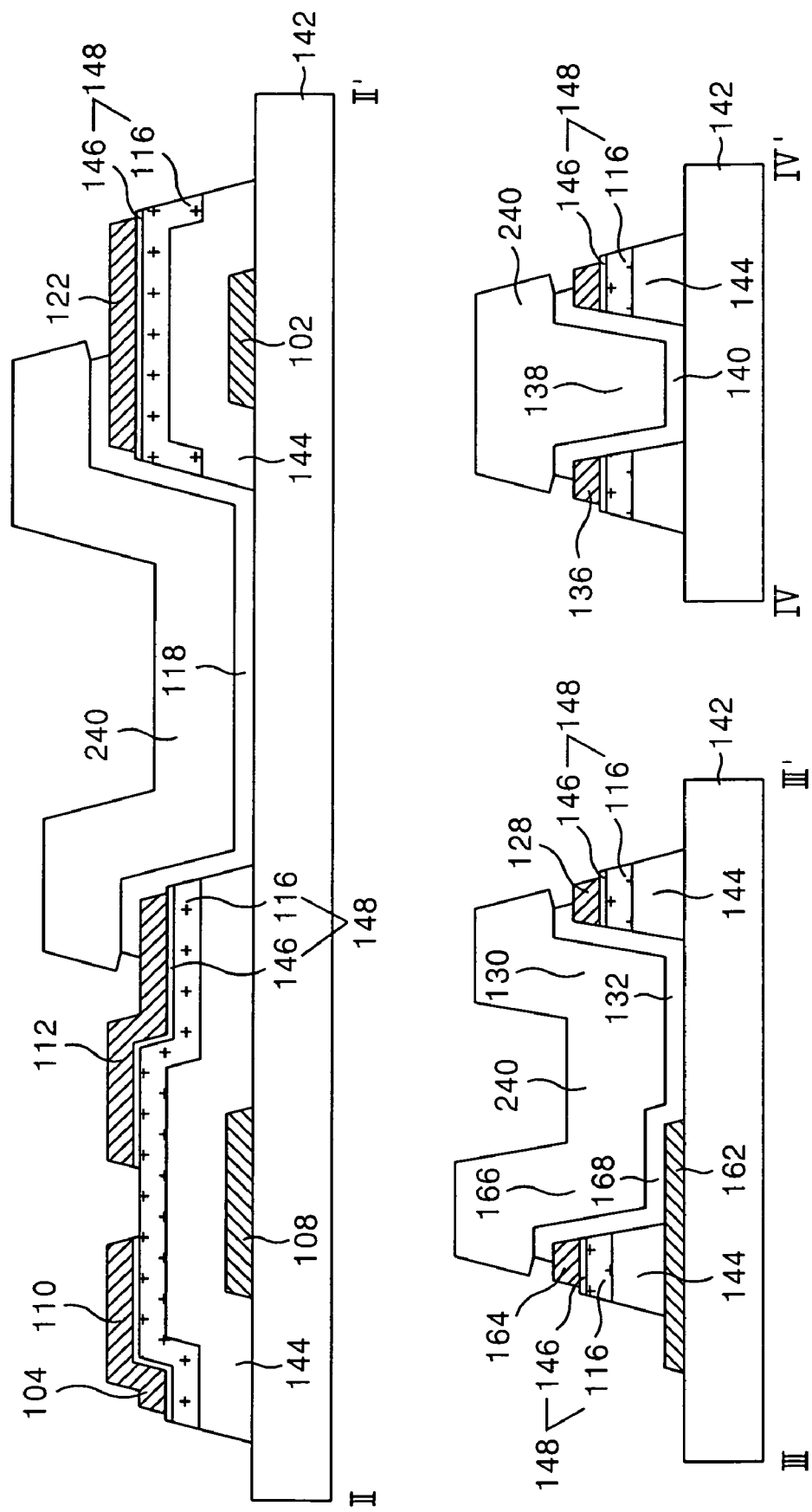

Referring to FIG. 8C, the transparent conductive film 117 is patterned by using the photo-resist pattern 240 as a mask, thereby forming the transparent conductive pattern including of the pixel electrode 118, the gate pad upper electrode 132, the contact electrode 168, and the data pad upper electrode 140. At this moment, the transparent conductive pattern is over-etched versus the photo-resist pattern 240 as the transparent conductive film is wet-etched. The pixel electrode 118 is formed in the pixel area separated from the gate line 102 and data line 104 and connected to the drain electrode 112 and storage upper electrode 122. The contact electrode 168 integrated with the gate pad upper electrode 132 is formed to overlap the gate pad lower electrode 128 and second gate link 164 through the first and second contact holes 130, 166. The data pad upper electrode 140 is formed to overlap the data pad lower electrode 136 through the third contact hole 138.

Figure 8D:
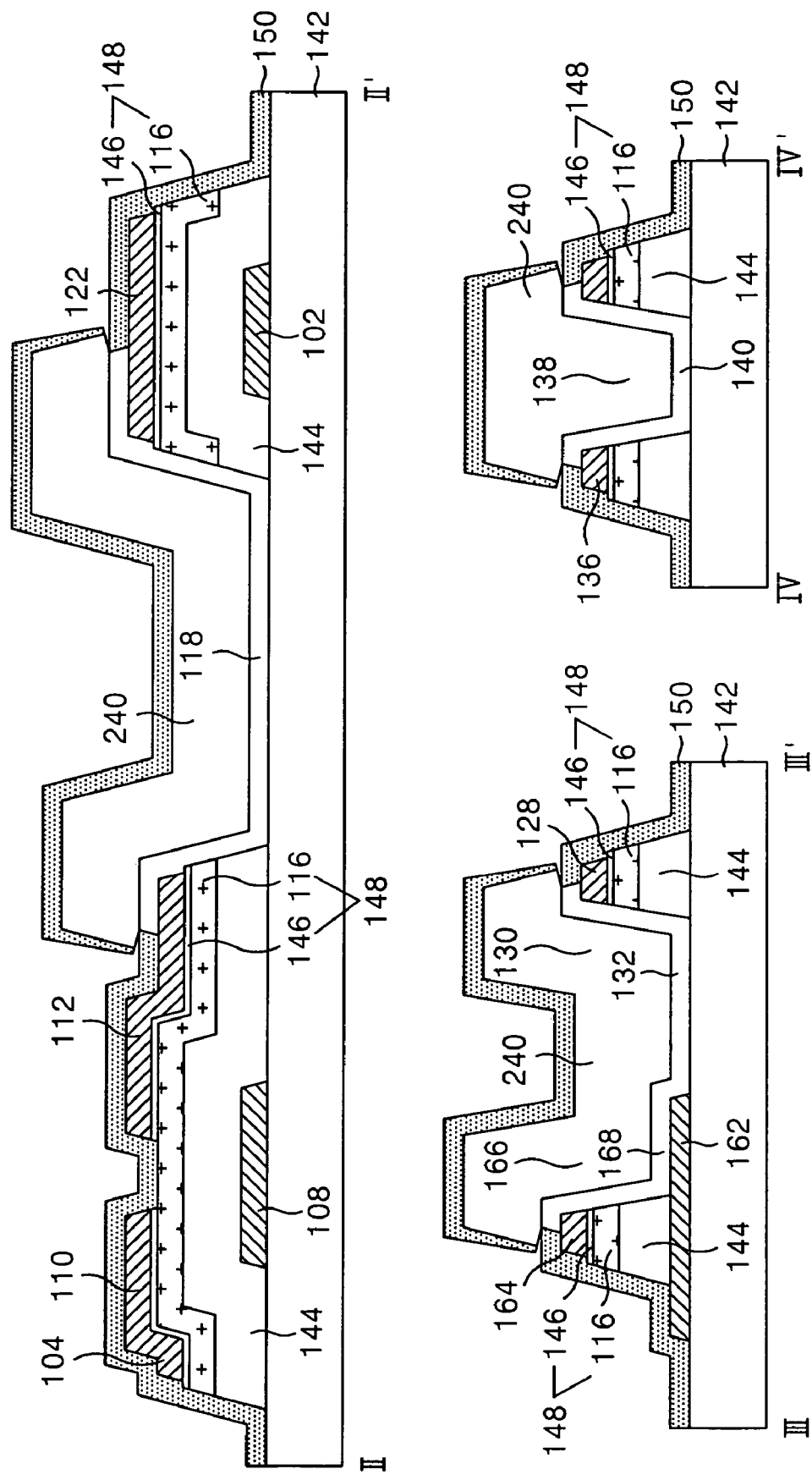

Referring to FIG. 8D, the passivation film 150 is formed to cover the entire surface of the photo-resist pattern 240. The passivation film 150 formed on the substrate where the photo-resist pattern 240 is not present and has an opening to the photo-resist pattern where an edge part of the photo-resist pattern 240 meets an edge part of the transparent conductive pattern. Accordingly, in the next lift-off process, a stripper easily penetrates between the photo-resist pattern 240 and the transparent conductive pattern, thereby increasing the lift-off efficiency. The passivation film 150 may be formed of an inorganic insulating material like the gate insulating film 144. The passivation film 150 is formed by a deposition method such as PECVD or sputtering, but it is desirable to be formed by the sputtering method in order to prevent the photo-resist pattern 240 from being hardened at a high temperature. Also, the passivation film 150 might be formed of an organic insulating material such as acrylic organic compound, BCB or PFCB.

Referring to FIG. 8E, the passivation film 150 formed together with and on the photo-resist pattern 240 is removed, thereby patterning the passivation film 150. The patterned passivation film 150 forms a border of the transparent conductive pattern. In other words, the passivation film 150 forms a border with the transparent conductive pattern in an area except where the transparent conductive pattern is formed.

FIGS. 9A to 9D illustrate cross sectional views for specifically explaining another embodiment of the third mask process of the present invention.

Referring to FIG. 9A, a transparent conductive film 117 is formed on the gate insulating film 144 where the source/drain metal pattern is formed, by a deposition method such as sputtering. A second photo-resist pattern 260 is formed on a first photo-resist 250 by a photolithography process using a third mask after a first photo-resist 250 is formed on the transparent conductive film 117. The second photo-resist pattern 260 is formed of a photo-acryl that can stand high temperature.

Figure 9B:
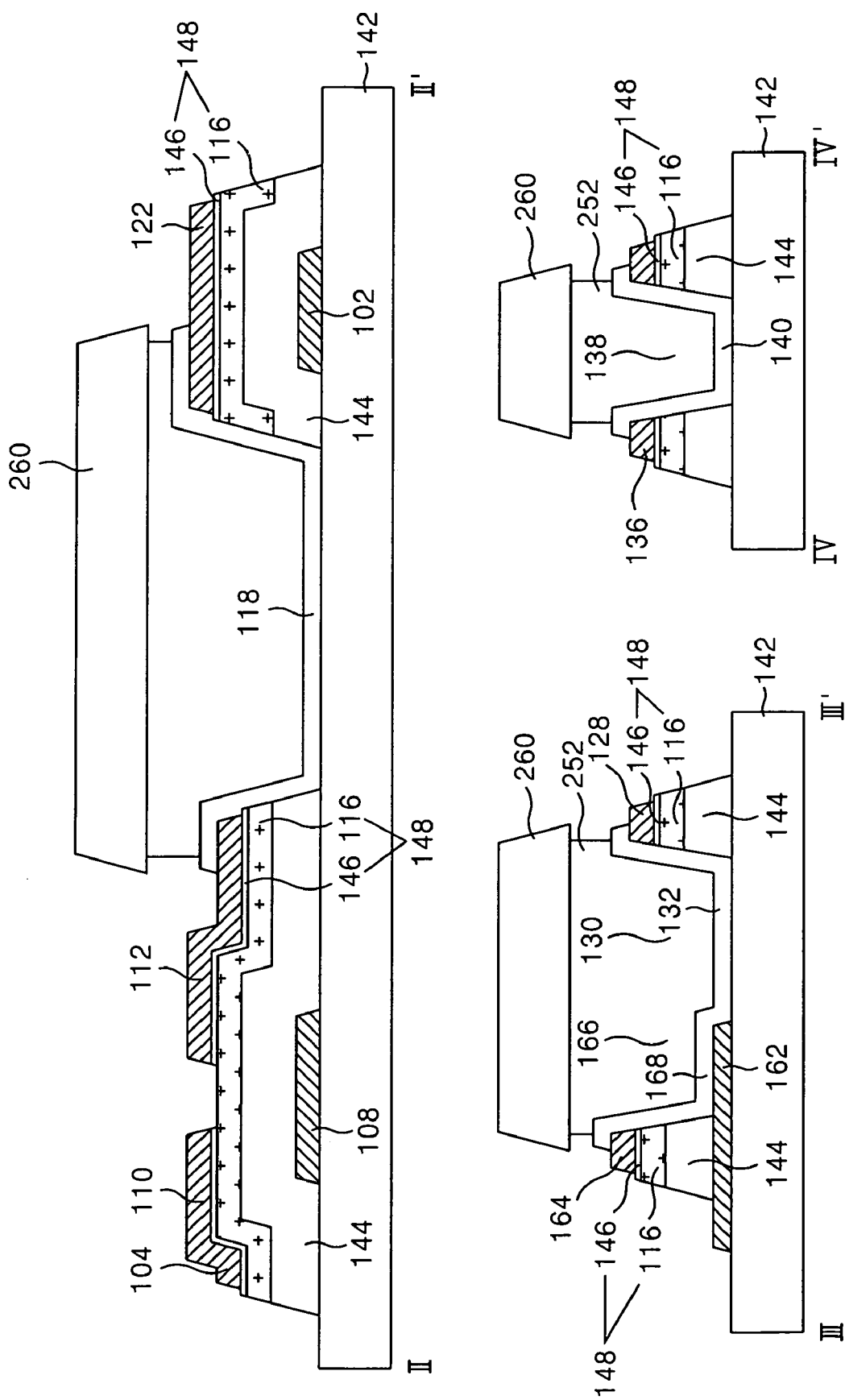

Referring to FIG. 9B, the first photo-resist 250 exposed outside the second photo-resist pattern 260 is removed by an ashing process, thereby forming the first photo-resist pattern 252 that overlaps the second photo-resist pattern 260. At this moment, the photo-resist pattern 252 is over-etched versus the second photo-resist pattern 260, thus the second photo-resist pattern 260 can sufficiently cover the first photo-resist pattern 252 thereunder. The transparent conductive film 117 is patterned by an etching process using the first and second photo-resist patterns 252, 260 as a mask, thereby forming the transparent conductive pattern. The transparent conductive film 117 is wet-etched, thus the transparent conductive pattern is over-etched versus the first photo-resist pattern 252.

Referring to FIG. 9C, the passivation film 150 is formed to cover the entire surface of the second photo-resist pattern 260. It is possible to prevent the first photo-resist pattern 252 from being hardened by the second photo-resist pattern 260 that can stand the high temperature. The first and second photo-resist patterns 252, 260 together with the passivation film 150 formed thereon are removed by the stripping process, thereby patterning the passivation film 150, as in FIG. 9D, and the patterned passivation film 150 forms a border with the transparent conductive pattern. In other words, the passivation film 150 that forms a border with the transparent conductive pattern in an area except where the transparent conductive pattern is formed. In this case, the passivation film 150 formed on the substrate where the second photo-resist pattern 260 is not present has an opening in the passivation film 150 formed on the second photo-resist pattern 260 due to a separation between an edge part of the second photo-resist pattern 260 and an edge part of the transparent conductive pattern. Accordingly, a stripper easily, penetrates between the first photo-resist pattern 252 and the transparent conductive pattern in the lift-off process of removing the first and second photo-resist patterns 252, 260 over which the passivation film 150 is formed, thereby improving the lift-off efficiency.

As described above, the thin film transistor substrate and the fabricating method thereof according to the present invention patterns the passivation film by lifting off the photo-resist pattern that is used when forming the transparent conductive pattern. Accordingly, the transparent conductive pattern is formed before the passivation film is formed, thus it is possible to protect the transparent conductive pattern and the source/drain metal pattern. Accordingly a process defect may be prevented and the process may be simplified to three mask processes.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising:
    a first mask process of forming a gate line on a substrate and a gate electrode connected to the gate line;
    a second mask process of forming a source/drain metal pattern including a data line crossing the gate line to define a pixel area, a source electrode connected to the data line, a drain electrode facing the source electrode, a semiconductor pattern that overlaps along and under the source/drain metal pattern to form a channel between the source electrode and the drain electrode, and a gate insulating pattern that overlaps along and under the semiconductor pattern; and
    a third mask process of forming a pixel electrode in the pixel area connected to the drain electrode and spaced apart from the gate line and the data line, and forming a passivation film that forms a border with the pixel electrode,
    wherein the third mask process includes:
    forming a transparent conductive film on the source/drain metal pattern;
    forming a photo-resist pattern on the transparent conductive film;
    forming a transparent conductive pattern including the pixel electrode, the pad upper electrode, and the contact electrode by an etching process using the photo-resist pattern as a mask;
    forming a passivation film which completely covers the photo-resist pattern; and
    patterning the passivation film by removing the photo-resist pattern where the passivation film is formed.

2. The method according to claim 1, wherein the second mask process further includes:
    forming a storage upper electrode that overlaps the gate line and connects to the pixel electrode and a gate insulating pattern and a semiconductor pattern that are formed on the gate line to overlap the storage upper electrode.

3. The method according to claim 1, wherein:
    the second mask process further includes:
    forming a pad lower electrode that is connected to at least one of the gate line and the data line and a semiconductor pattern and a gate insulating pattern that overlap under the pad lower electrode; and
    forming a contact hole that penetrates from the pad lower electrode to the gate insulating pattern, and
    the third mask process further includes:
    forming a pad upper electrode that overlaps the pad lower electrode through the contact hole to connect to the pad lower electrode.

4. The method according to claim 3, wherein:
    the first mask process further includes:
    forming a first gate link extended from the gate line;
    the second mask process further includes:
    forming a second gate link extended with the semiconductor pattern and the gate insulating pattern from the pad lower electrode that is connected to the gate line; and
    forming a second contact hole that penetrates the gate insulating pattern to the second gate link to expose the first gate link; and
    the third mask process further includes:
    forming a contact electrode that overlaps the first and second gate links through the second contact hole to connect the first gate link to the second gate link.

5. The method according to claim 4, wherein the passivation film forms a border with the pad upper electrode and the contact electrode.

6. The method according to claim 4, wherein the contact hole penetrating to the pad lower electrode connected to the second gate link is extended along the second gate link to form the second contact hole, and the pad upper electrode is extended along the second gate link to form the contact electrode.

7. The method according to claim 4, wherein the pixel electrode, the pad upper electrode, and the contact electrode are formed of a transparent conductive film.

8. The method according to claim 4, wherein the second mask process includes:
    forming a gate insulating film, a semiconductor layer, and a source/drain metal layer on the gate line, and the gate electrode;
    forming photo-resist patterns with different thicknesses by using one of a diffractive exposure mask and a partial transmission mask;
    forming the source/drain meal pattern including a drain electrode integrated with the source electrode, the semiconductor pattern and the gate insulating pattern and forming the contact hole and the second contact hole by an etching process using the photo-resist pattern as a mask; and
    etching the source/drain metal pattern exposed through the photo-resist pattern and an ohmic contact layer of the semiconductor pattern.

9. The method according to claim 1, wherein forming the photo-resist pattern includes:
    forming a first photo-resist on the transparent conductive film;
    forming a second photo-resist pattern on the first photo-resist by a photolithography process; and
    forming a first photo-resist pattern that is overlapped by the second photo-resist pattern, by patterning the first photo-resist.

10. The method according to claim 9, wherein the second photo-resist pattern is formed of a photo-acryl.

11. The method according to claim 9, wherein the first photo-resist pattern is over-etched versus the second photo-resist pattern.

12. The method according to claim 1, wherein the passivation film is formed by a sputtering method.

13. The method according to claim 1, wherein the transparent conductive pattern is over-etched versus the photo-resist pattern.

14. The method according to claim 13, wherein the transparent conductive film is etched by a wet etching.

* * * * *